Mar. 20, 1923.

F. MULLER 1,449,125

MACHINE FOR MILLING BLANKS FOR CUTTERS

Filed June 2, 1917   8 sheets-sheet 1

INVENTOR
Friederich Müller
BY S. Jay Teller
ATTORNEY

Mar. 20, 1923.

F. MÜLLER 1,449,125

MACHINE FOR MILLING BLANKS FOR CUTTERS

Filed June 2, 1917      8 sheets-sheet 4

INVENTOR
Friederich Müller
BY S. Jay Teller
ATTORNEY

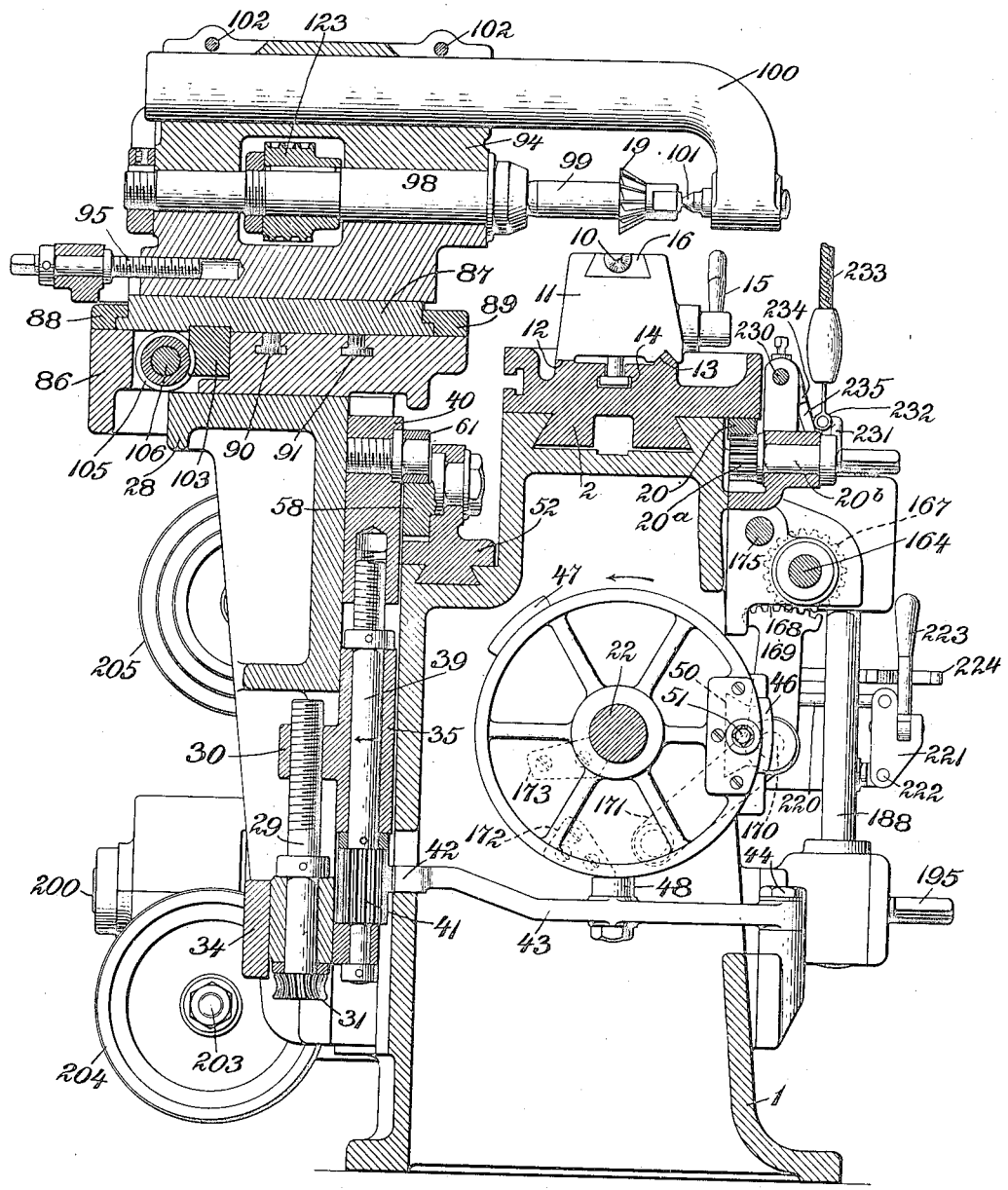

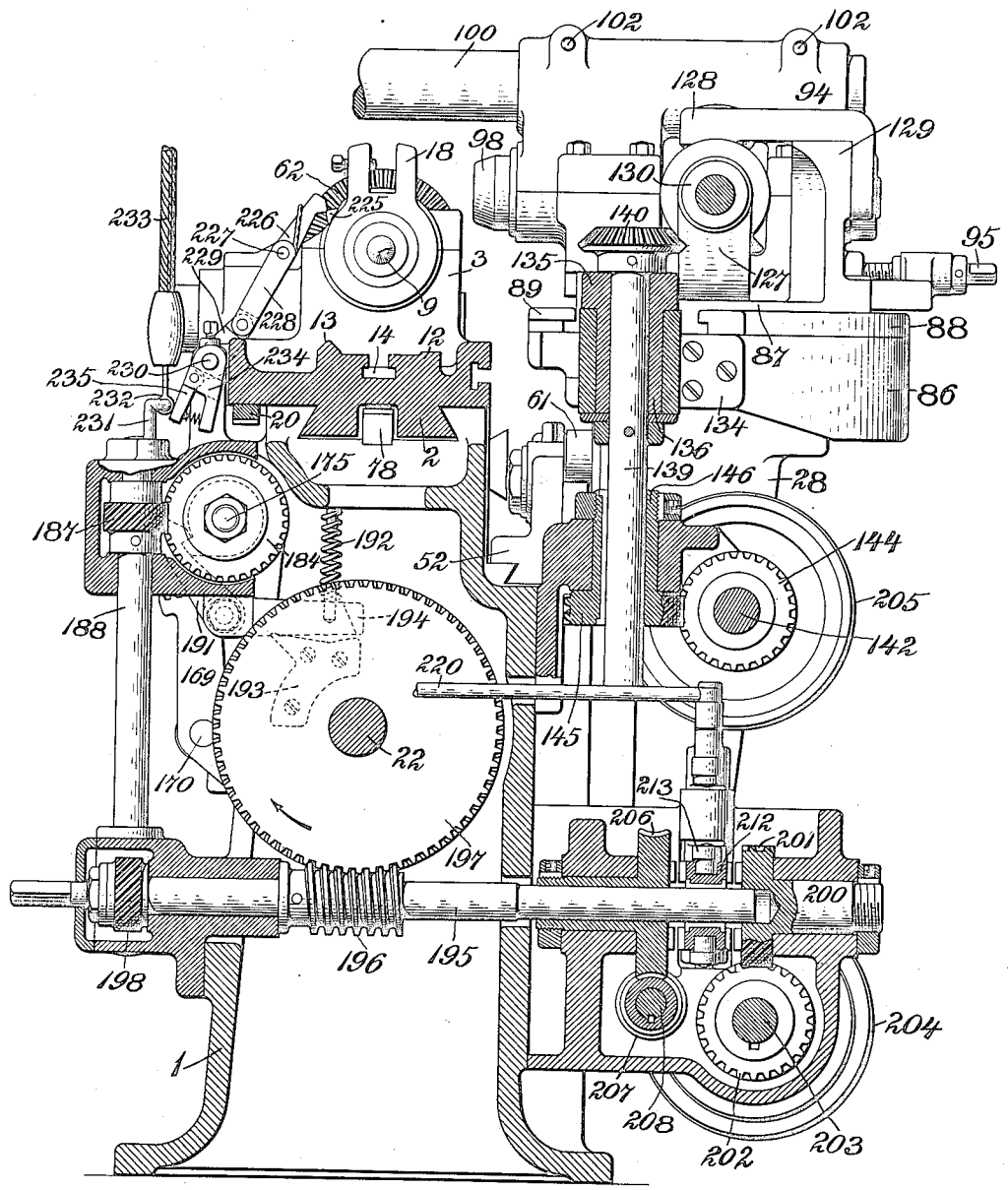

Mar. 20, 1923.
F. MÜLLER
1,449,125
MACHINE FOR MILLING BLANKS FOR CUTTERS
Filed June 2, 1917      8 sheets-sheet 7
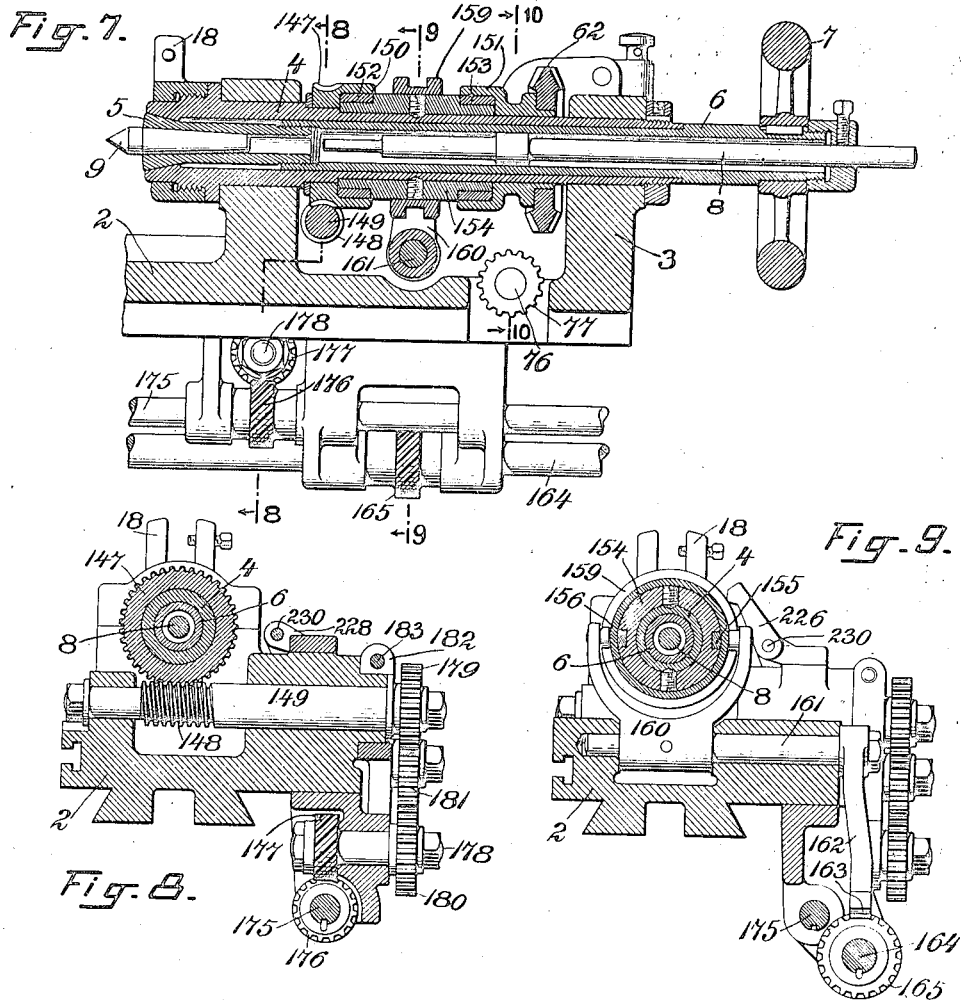
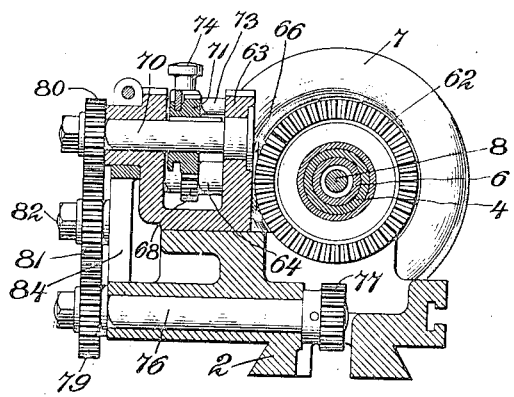
INVENTOR
Friederich Müller
BY S Jay eller
ATTORNEY

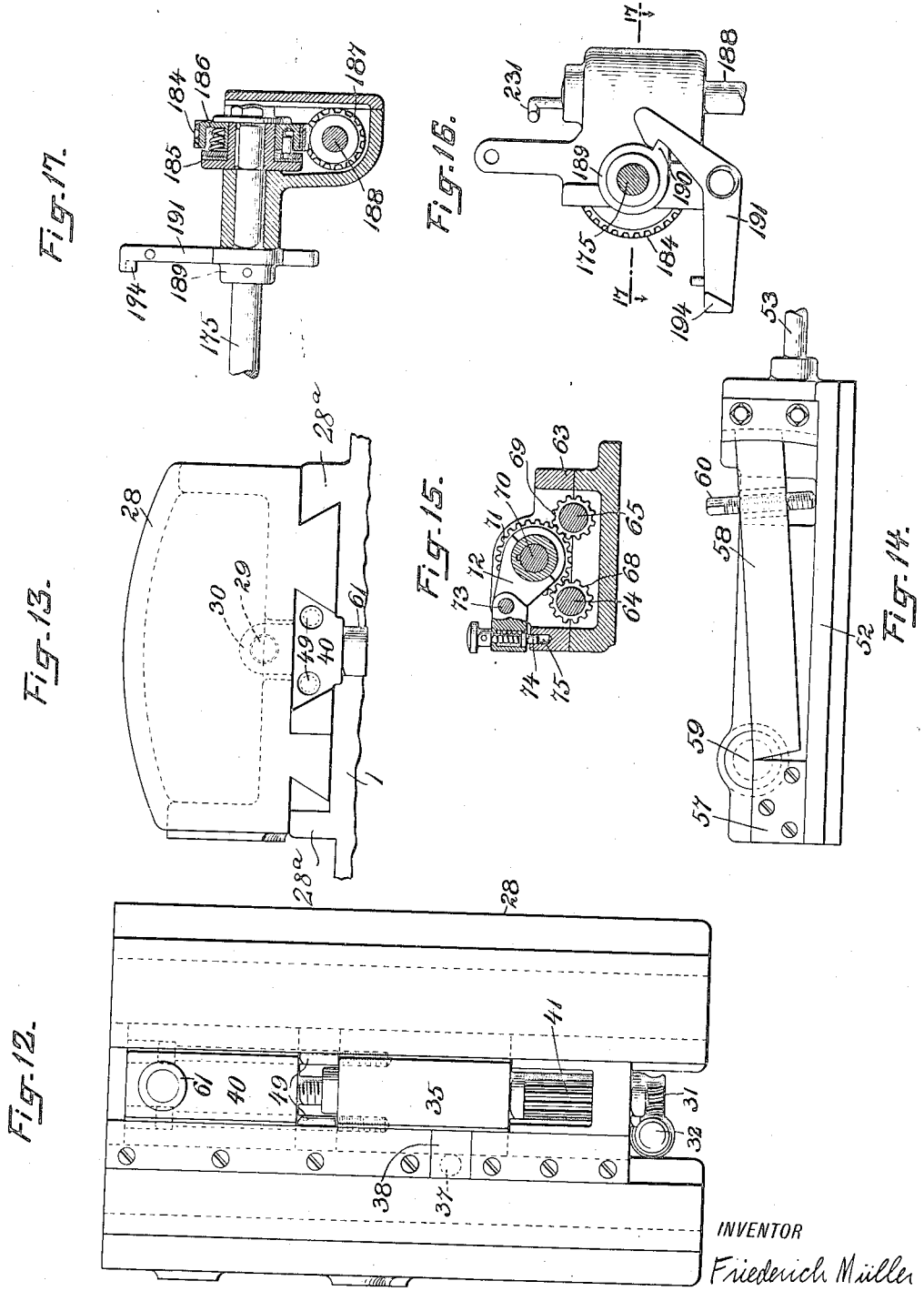

Patented Mar. 20, 1923.

1,449,125

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MACHINE FOR MILLING BLANKS FOR CUTTERS.

Application filed June 2 1917. Serial No. 172,413.

*To all whom it may concern:*

Be it known that I, FRIEDERICH MÜLLER, a citizen of the United States, residing at Hartford, in the county of Hartford and State of Connecticut, have invented certain new and useful Improvements in Machines for Milling Blanks for Cutters, of which the following is a specification.

A machine embodying the invention is especially well adapted for the cutting of grooves in taps, reamers, milling cutters and other metal working tools. The machine can be used for the cutting either of straight grooves or of right or left-hand helical grooves of any desired angular pitch; the grooves can be cut in blanks which are cylindrical or which are uniformly tapered or which otherwise vary in diameter from end to end; and the blanks can be indexed, preferably automatically, so that any desired number of grooves can be cut in each.

One of the objects of the invention is to provide in a milling machine of the class specified improved means whereby the milling cutter is held in proper relation with the blank during movement thereof in one direction and is moved away from the blank during movement thereof in the other direction. Another object of the invention is to provide improved means whereby the milling cutter is moved toward or away from the axis of the blank during the milling operation in accordance with variations in the diameter of the blank. Still another object of the invention is to provide improved means for rotating the blank, preferably in either direction, in accordance with the desired angle of inclination of the grooves to be cut.

A further object of the invention is to provide improved means for preliminarily adjusting the milling cutter angularly and otherwise to adapt it for the cutting of grooves of the desired depth, shape and angle of inclination. Another object of the invention is to provide means adapted to permit the cutting of helical grooves in blanks which vary in diameter from end to end.

Another object of the invention is to provide improved means for indexing the blank in accordance with the number of grooves to be cut. A further object of the invention is to provide improved automatic means for stopping the operation of the machine after the grooving of a blank has been completed.

Still further objects of the invention will be apparent from the following specification and claims.

In the accompanying drawings I have shown the embodiment of the invention which I now deem preferable, but it will be understood that the drawings are intended to be merely illustrative and are not intended to define or limit the scope of the invention, the accompanying claims being relied upon for that purpose.

Of the drawings:

Fig. 5 is a central transverse vertical sectional view taken from the left.

Fig. 6 is a transverse vertical sectional view taken from the right.

Fig. 7 is a fragmentary longitudinal view taken from the rear and showing the headstock and associated parts partly in elevation and partly in vertical section.

Fig. 8 is a transverse sectional view taken along the line 8—8 of Fig. 7.

Fig. 9 is a transverse sectional view taken along the line 9—9 of Fig. 7.

Fig. 10 is a transverse sectional view taken along the line 10—10 of Fig. 7.

Fig. 11 is a fragmentary detail view showing the clutch mechanism for actuating the spindle.

Fig. 12 is a view showing the cutter-supporting bracket and associated parts detached from the machine.

Fig. 13 is a plan view of the parts shown in Fig. 12.

Fig. 14 is a detail view of a part of the mechanism for controlling the cutter.

Fig. 15 is a detail view showing a part of the mechanism for imparting rotative movement to the blank.

Fig. 16 is a detail view showing a part of the indexing mechanism.

Fig. 17 is a sectional view taken along the line 17—17 of Fig. 16.

Figure 1:
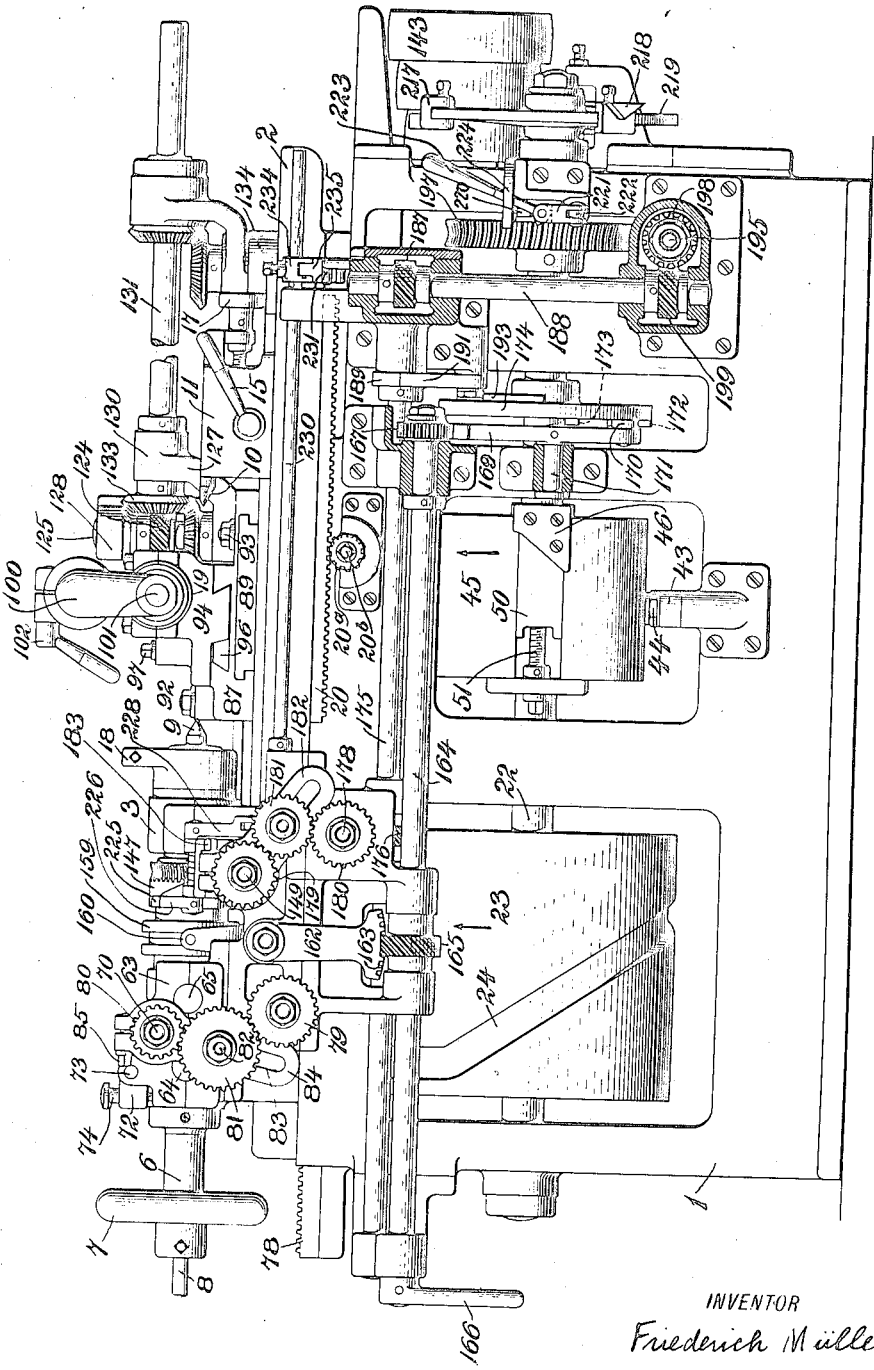
Fig. 1 is a front view with certain parts shown in section.

Referring to the drawings, 1 represents the main frame casting or support upon which the several parts of the mechanism are mounted. Slidably mounted on ways extending longitudinally of the frame or support 1 is a work-carrying table 2. Supported on the table 2 are means for holding and manipulating the work, which is usually a rotatable blank to be grooved. It is to be understood, however, that as concerns certain features, the invention is not limited to the grooving or cutting of a rotatable blank, but can be embodied in a machine adapted for cutting other classes of work, such as blocks or other pieces adapted to be secured directly to the table. When the work is a rotatable blank, the holding means comprises a headstock 3 having a rotatable spindle 4. The spindle 4 preferably carries a collet 5 which is controlled by a sleeve 6, and a hand wheel 7. The blank to be grooved may be mounted directly in the collet 5, and, in order to provide a stop for the blank when so mounted, a rod 8 is adjustably mounted in the sleeve 6.

Under most circumstances, particularly when relatively long blanks are to be grooved, it is desirable to mount the blanks between centers instead of directly in the collet 5 as set forth above. When centers are to be used, one of them is mounted in the collet 5, as shown at 9, and the other of them, as shown at 10 is mounted in a suitable tailstock 11. The tailstock is movable along ways 12 and 13 extending longitudinally of the table 2 and can be locked in place by means of a T-bolt which enters a longitudinal T-slot 14. The T-bolt can be tightened or loosened by means of the handle 15. The center 10 is carried by a slide 16 which is adjustable longitudinally of the tailstock by means of a screw carrying a hand wheel 17.

For turning a blank carried by the centers, the spindle 4 is provided with a suitable driver 18 which is adapted to be connected with the blank by means of a dog or other usual device.

Suitably mounted above the centers 9 and 10 is a milling cutter 19 adapted to engage a blank held by the centers. While the invention is not necessarily so limited the milling cutter 19 is preferably mounted with its axis extending transversely of the blank axis so as to be adapted to cut generally longitudinal grooves in the blank. The means for holding, adjusting and rotating the cutter will be fully set forth hereinafter. It will be observed that the top plane of the tailstock is only slightly above the axis of the centers, thus permitting the cutter 19 to have free access to the blank from the top For moving the table to effect preliminary adjustments, there is preferably provided a rack 20 which meshes with a pinion $20^a$ on a short horizontal shaft $20^b$. This shaft $20^b$ is suitably mounted in a bearing carried by the main frame and is squared at its end to receive a wrench or crank. By turning the shaft the table may be preliminarily moved as desired.

Figure 3:
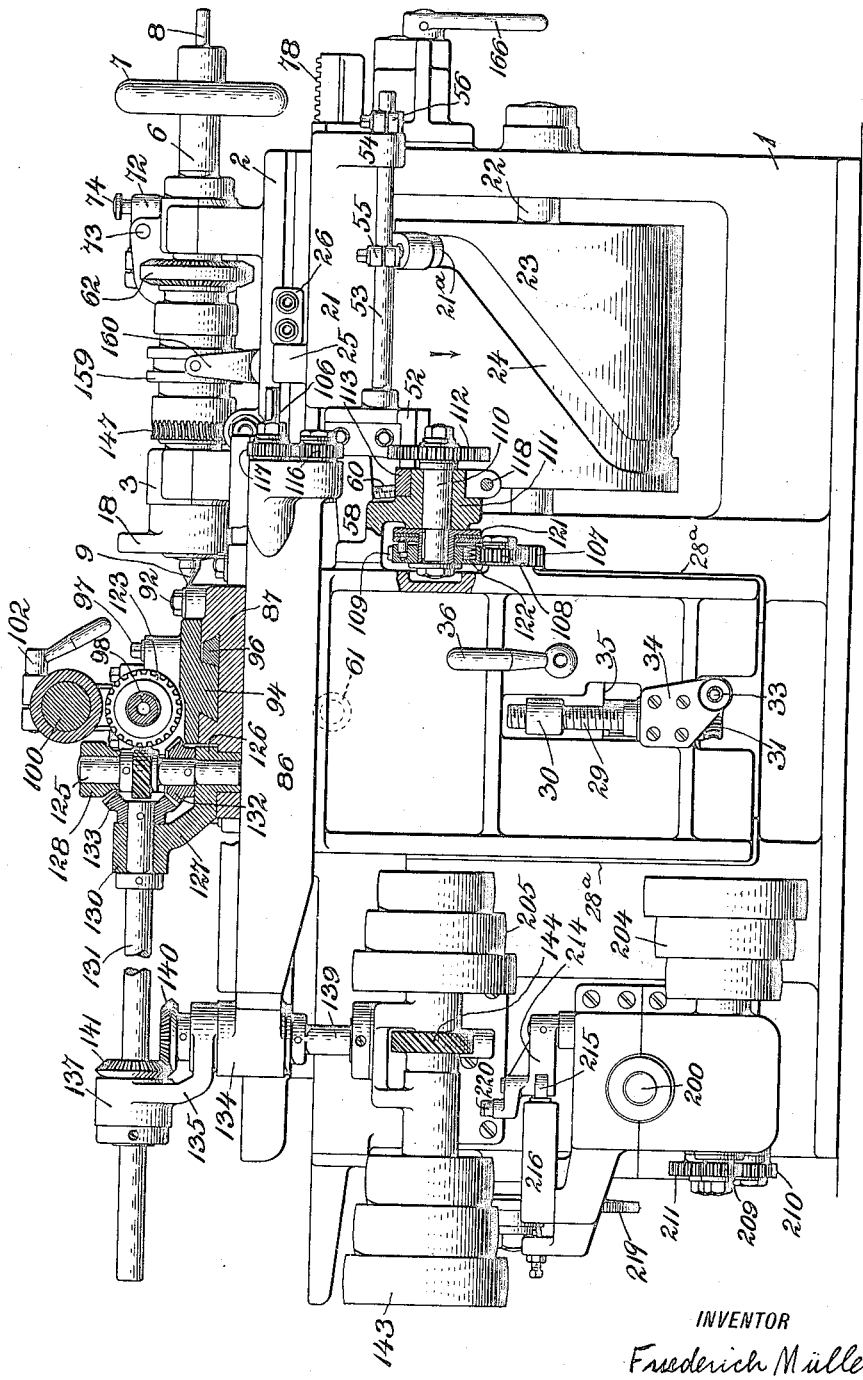
Fig. 3 is a rear view with certain parts shown in section.
Figure 4:
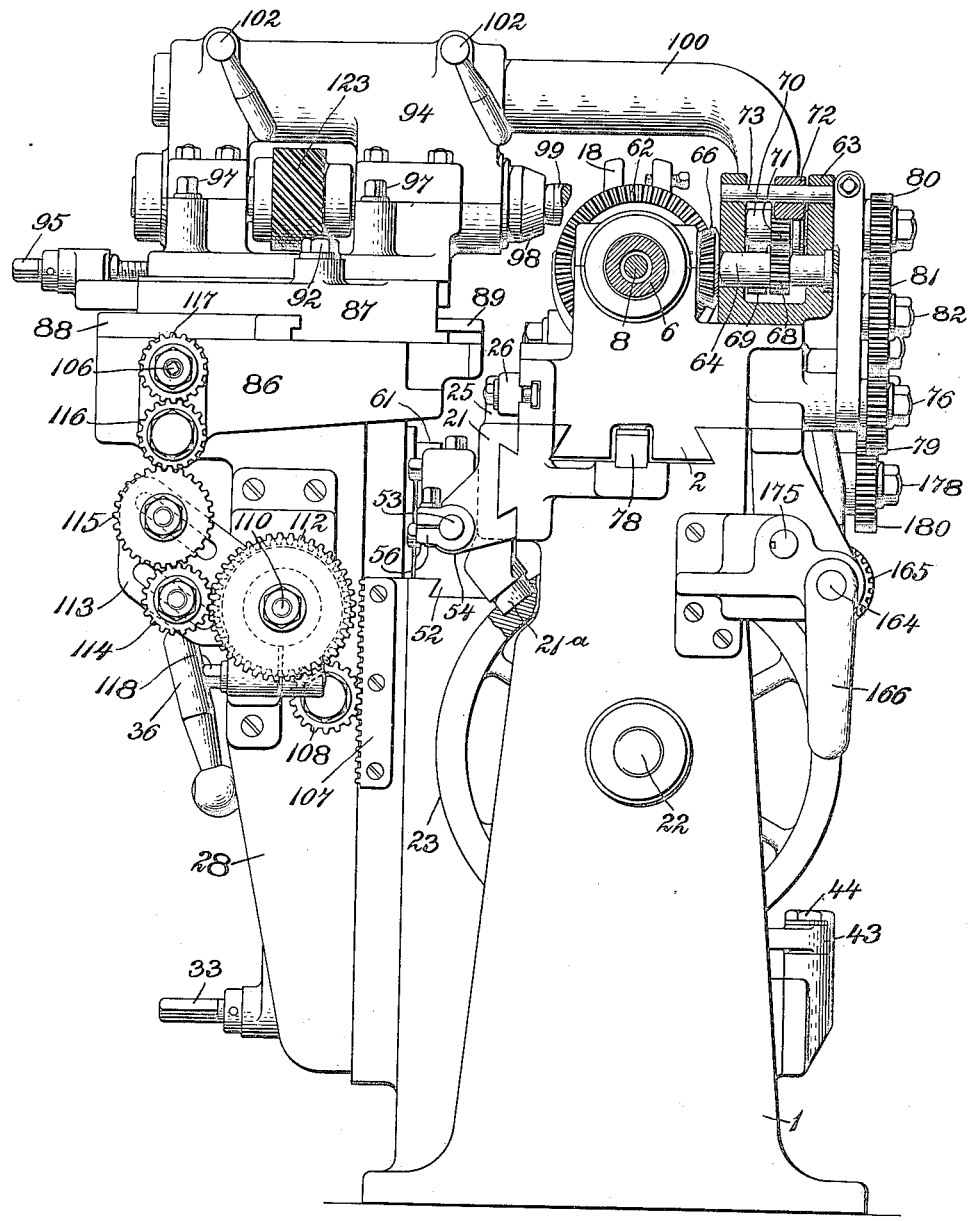
Fig. 4 is a view taken from the left-hand end with certain parts shown in section.

Formed at the back of the main frame 1 are longitudinal guideways upon which is movably mounted a slide 21. This slide has a depending projection or stud which carries a roller $21^a$. Rotatably mounted in bearings in the main frame is a longitudinal shaft 22 which carries a cam drum 23 provided with a cam groove 24 into which the roller $21^a$ enters. The drum 23 is rotated in the direction indicated by the arrows in Figs. 1 and 3 and the groove 24 therein has one section which is relatively sharply inclined in one direction, as shown in Fig. 3, and another section which is less sharply inclined in the other direction, as shown in Fig. 1. Between these two sections of the groove is a section which is perpendicular to the axis of the drum, this section engaging the roller immediately after the sharply inclined section. The result is that the slide 21 is moved backward relatively rapidly (toward the right as shown in Fig. 3) and is moved forward relatively slowly (toward the left as viewed in Fig. 3). At the end of the backward movement the slide is maintained stationary for a brief period.

The slide 21 carries an upward projecting lug 25 which is adapted to engage dogs 26 and 27 which are adjustably secured to the rear side of the table 2. By means of these dogs the table is made to reciprocate when the slide 21 is reciprocated, and the limits of the reciprocating movement can be changed by changing the positions of the dogs. The length of the stroke can be changed by bringing the dogs closer together or farther apart, and the limits of reciprocation can be moved toward the right or toward the left without changing the length of stroke by properly moving the dogs and keeping them the same distance apart.

When the blank has been mounted on the centers 9 and 10 in the usual way, the movement of the table in the way described serves to move the blank longitudinally past the cutter 19 which cuts a groove in the blank, the form of the groove corresponding with the form of the cutter.

The cutter 19 is supported on a bracket or support 28 by means of various intermediate frame parts which will presently be described. The bracket or support 28 is preferably in the form of a knee which engages suitable vertical guides $28^a$ on the main frame 1 and is vertically movable along these guides. In order to vertically adjust the cutter 19 to bring it into the desired relationship to the blank, the knee 28 is vertically adjustable by means of a screw 29. The lower part of the screw is rotatably mounted in a bearing in the lower part of the bracket and is held against longitudinal movement with respect thereto. The upper threaded part of the screw extends through a threaded lug or nut 30 which is supported on the main frame in the manner to be presently described. At the lower end of the screw 29 is a worm wheel 31 which meshes with a worm 32. This worm is mounted on a short horizontal shaft 33 which is rotatably mounted in a bearing member 34 carried by the knee 28. The shaft 33 is provided with a squared end by means of which it can be turned to turn the screw 29 and adjust the knee 28 and the cutter 19.

The lug 30 is formed on a block 35 which is relatively movable vertically in guideways formed in the bracket 28. After the adjustment of the bracket by means of the screw 29 as aforesaid, the bracket and the block can be locked together in adjusted position by means of the handle 36 carried by a screw 37 threaded into a gib 38.

From the foregoing description it will be clear that I have provided a machine in which the main frame or bed is provided at its top with horizontal table supporting means in the form of longitudinal horizontal guideways and which is provided at one side with external vertical guideways below the level of the horizontal guideways. The work table is horizontally reciprocable on the horizontal guideways and the cutter carrying knee is vertically movable or adjustable along the vertical guideways. This novel relationship between the table and its supporting means and the knee and its supporting means makes it possible for a cutter spindle projecting in a generally horizontal direction from the knee to hold a cutter in operative relation to work on the reciprocable table and also makes it possible for a cutter to be vertically adjustable with respect to the table.

Figure 2:
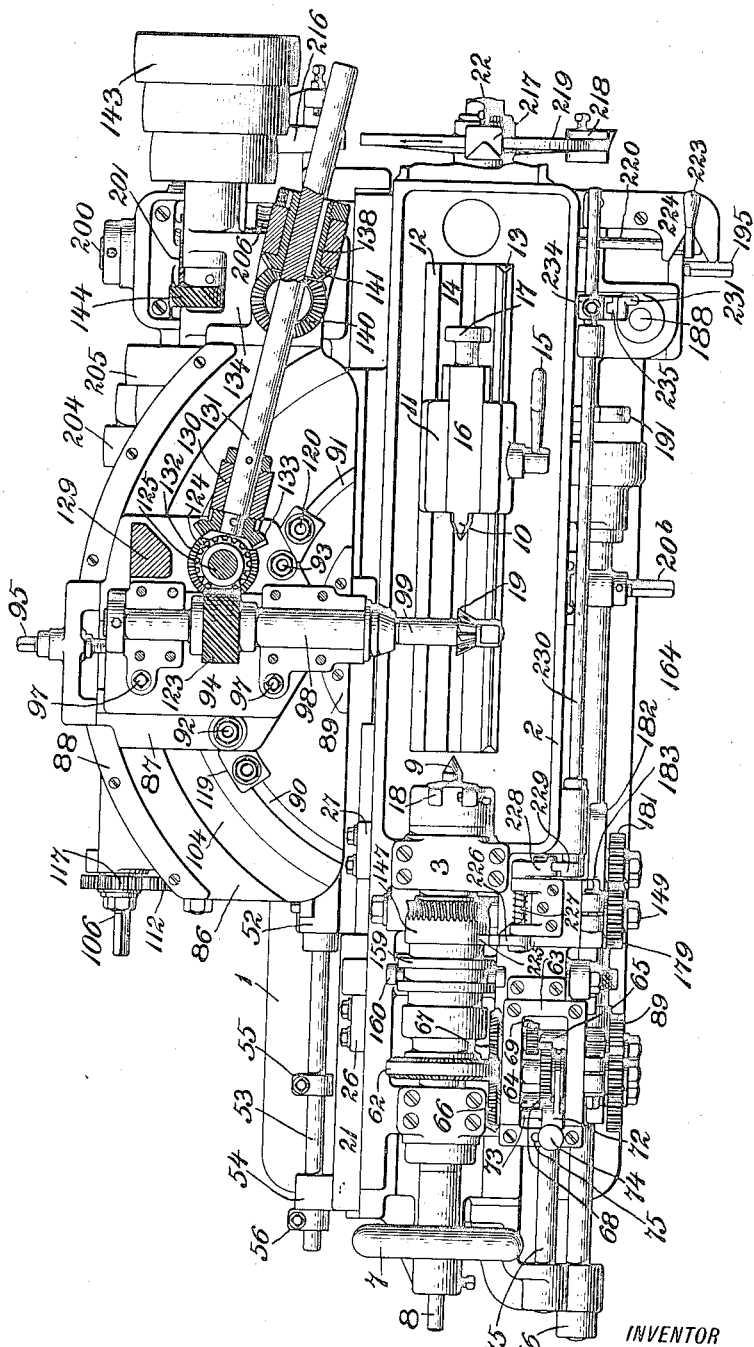
Fig. 2 is a plan view with certain parts shown in section.

In normal operation the cutter acts on the blank during movement of the carriage in the forward direction; that is, during movement toward the right as viewed in Figs. 1 and 2. During movement of the table in the backward direction it is necessary to separate the cutter and the blank in order that the cutter may not mar the blank in any way. I effect this separation by lifting the cutter at the end of the forward movement of the table and maintaining it in elevated position during the backward movement. For this purpose the following mechanism is provided: Rotatably mounted in a suitable vertical aperture in the block 35 is a shaft or screw 39 which is held against any considerable longitudinal movement with respect to the said block. The upper end of the shaft 39 is threaded and enters a threaded aperture in a block 40 which is supported on the main frame 1. It will be seen that by turning the shaft 39 it is possible to raise or lower the block 35 together with the bracket 28 and the parts carried thereby including the cutter 19. The bracket 28 moves upward or downward in parallelism.

The shaft 39 is provided at or near its lower end with a relatively wide spur gear wheel or pinion 41 which meshes with a segmental gear or curved rack 42 formed at the end of a lever 43. This lever is vertically pivoted at 44 to the main frame casting 1 near the front thereof. A cam drum 45 is mounted on the aforesaid cam shaft 22 and is provided with two oppositely inclined cam members 46 and 47. Carried by the lever 43 near the center thereof is a roller 48 adapted to be engaged by the said cam members 46 and 47. The cam member 46 is so positioned that it engages the roller 48 when the cam 23 has moved the table to its extreme forward position. The cam member 46 is so shaped that it moves the lever 43 toward the left, as viewed in Fig. 1, thus turning the shaft 39 in the clockwise direction, as indicated by the arrow in Fig. 5. By virtue of this rotative movement of the shaft 39, the upper threaded end thereof draws the shaft upward, the shaft carrying with it the bracket 28 and the parts carried thereby including the cutter 19. The bracket 28 and associated parts are maintained in this upper position until the beginning of the next forward movement of the table. Then the cam 47 engages the roller 48, thus moving the lever 43 toward the right and rotating the shaft 39 in the counter-clockwise direction. The threaded end of the shaft causes the bracket 28 to be lowered, thus moving the cutter 19 downward to its normal cutting position where it remains during the entire forward movement of the table.

Usually it is desirable to provide means supplemental to the last described adjusting mechanism for holding the knee or support 28 in the position to which it is moved by the said adjusting mechanism. Furthermore, it is important that the cutter 19 shall always assume the same normal cutting position. In order that this position may not be entirely dependent upon the exact amount of rotation of the shaft 39, and in order that the support may be supplementally held I preferably provide a holding or limiting means as illustrated in Fig. 12. Two vertical bolts 49 are threaded into the upper part of the block 35 and extend through suitable apertures in the block 40. The upper ends of the bolts are provided with heads which are positioned in recesses in the block 40. When these heads engage the bottoms of their recesses, downward movement of the block 35 and of all of the parts connected therewith is definitely and positively limited. If it becomes necessary to change the limit of downward movement (to change the depth of the grooves), this is accomplished by means of the screw 29 in the manner already described.

In order that the extent of upward movement of the cutter may be changed, the cam member 46 is preferably adjustable longitudinally of the axis of the drum 45. The cam member is mounted on a slide 50 movable by means of a screw 51. By adjusting the cam member 46 in this way the extent of movement of the lever 43 toward the left can be changed, thus changing the amount of rotation of the shaft 39 and the amount of elevation of the cutter 19.

It is frequently desired to cut blanks which are non-cylindrical or which are otherwise provided with tapered or irregular surfaces. Preferably as already stated the cutting of a rotatable blank consists in the formation of generally longitudinal grooves therein, but as concerns the feature to be now described the invention is not so limited. Usually such non-cylindrical blanks are tapered, the diameter varying uniformly from end to end, but in some cases the diameter may vary in other ways, this giving the blank a longitudinal contour differing from a single straight line. For cutting such non-cylindrical blanks it is necessary to vary the distance between the cutter and the axis of the blank as the cutting operation proceeds. I accomplish this by moving the cutter toward or from the blank in such a way as to maintain the cutter axis in fixed angular relationship with the direction of the said movement. This is effected by means of mechanism such as that to be now described.

I provide a suitable guide member which by reason of its shape or its position conforms to the longitudinal outline with which the blanks are to be cut. This guide member is engaged by a suitable follower and relative movement takes place between the guide member and the follower in accordance with the relative movement between the blank and the cutter. As illustrated, the guide member is carried by a slide 52 which is movably mounted in horizontal guideways formed at the rear of the main frame 1. Projecting longitudinally from the slide 52 is a rod 53 which extends through an aperture in a lug 54 formed on the slide 21. Adjustably connected to the rod 53 and located on opposite sides of the lug 54 are two dogs 55 and 56. By properly adjusting these dogs 55 and 56 the slide 52 can be made to reciprocate in synchronism with the table 2. Usually the dogs will be so adjusted that the length of stroke of the slide 52 will be the same as that of the table 2, but obviously the length of stroke can be made different when required.

As shown most clearly in Fig. 14, the guide member consists of two parts 57 and 58 mounted on the slide 52. As shown, the part 57 of the guide member is rigidly secured to the slide with its top surface horizontal. The part 58 of the guide member is in the form of a cam or taper bar pivotally connected to the slide at 59 and adjustable about the axis of the pivot by means of the screw 60. The before mentioned follower for engaging the guide member consists of a roller 61 carried on the front face of the block 40 and adapted to engage the top surfaces of the members 57 and 58. It will be recalled that the bracket 28 and the various parts associated therewith, including the cutter 19, are entirely dependent upon the block 40 for their support, and it will now be seen that the block 40 is supported entirely by the roller 61 which engages one of the members 57 and 58. When the slide 52, with the guide member, is moved in the way already described, the roller 61, together with the block 40 and all of the parts supported thereby, are moved upward or downward in accordance with the direction of movement of the slide. The extent of such upward or downward movement will be dependent upon the angle of inclination of the taper bar 58. Inasmuch as the slide 52 moves in synchronism with the table 2, the cutter 19 is moved away from or toward the axis of the blank simultaneously with the movement of the blank under the cutter. If the blank is a simple tapered one, the vertical movement of the cutter can be made to conform to the taper of the blank by properly adjusting the stops 55 and 56 and by properly inclining the taper bar 58.

From the foregoing description it will be seen that I have provided three independently operable vertically movable or adjustable devices, each adapted to effect relative vertical movement or adjustment between the work table and the cutter spindle. As concerns some of the broader phases of the invention, I do not limit myself to the arrangement of these three devices in the exact way described, as certain variations may be made. Preferably, however, at least two of the said devices, if not, in fact, all three of them, are connected to move or adjust the support or knee which is engaged by the vertical guideways at the side of the bed. Preferably this vertically movable knee carries the cutter in the way illustrated and already described. When the three devices are all connected to operate the same support they are preferably arranged in series so that the first of them is bodily movable by the second and third and so that the second of them is bodily movable by the third.

So far as described up to the present point, it has been assumed that the grooves to be cut by the cutter are to be parallel with the axis of the blank. It is frequently desired, however, to cut either right-hand or left-hand helical grooves. In order that such grooves may be cut, I provide means for turning the spindle 4 during the longitudinal movement of the table and thus turning the blank. Mounted on the spindle 4 and connected therewith by means to be presently fully described, is a gear wheel 62 provided with two oppositely disposed sets of bevel teeth. Mounted on the table 2 is a bearing bracket 63. In this bracket are mounted two transverse horizontal shafts 64 and 65 respectively carrying bevel gears 66 and 67 which mesh with the teeth of the gear 62. The shaft 64 carries a spur gear 68 and the shaft 65 carries a spur gear 69, these two gears being similar to each other but being placed at different positions on their respective shafts. Also mounted in the bracket 63 is a shaft 70 and splined on the shaft is a gear wheel 71 adapted to mesh either with the gear wheel 68 or with the gear wheel 69. The hub of the gear wheel 71 is provided with a groove in which fits an arm 72. This arm is guided by a transverse horizontal rod 73 and carries a spring-pressed pin 74 which is adapted to enter one or the other of two apertures 75 formed in the bracket 63. By means of this construction the gear wheel 71 can be engaged either with the gear wheel 68 or with the gear wheel 69 and can be locked in one position or the other as required.

Mounted in a suitable bearing aperture in the table 2 is a transverse shaft 76 which is parallel with the shaft 70. This shaft 76 carries a spur gear 77 which meshes with a rack 78 carried by the main frame 1, the lower part of the table 2 being cut away to provide room for the rack, as shown. The shaft 76 carries a spur gear 79 and the shaft 70 carries a spur gear 80. Interposed between these gears 79 and 80 is an idler gear 81. This idler gear is mounted on a stud 82 which is adjustable in a slot 83 formed in an arm 84. The arm 84 pivotally engages a hub formed on the bracket 63 concentrically with the shaft 70, and a screw 85 is provided for clamping the arm to the hub. It will be seen that, by means of the construction described, the shaft 76 will be rotated whenever the table 2 is moved, and this rotative movement will be transmitted to the shaft 70 and from it to one or the other of the shafts 64 and 65, dependent upon the position of the gear 71. From the shaft 64 or 65, as the case may be, motion is transmitted to the gear 62, and thus the spindle 4 and the blank are rotated in one direction or the other as required. By changing the position of the arm 72 and thus of the gear 71, the direction of rotation of the blank can be changed and the machine thus adapted for cutting right-hand helices or left-hand helices as required.

In order to insure the cutting of helices of the desired pitch, it is necessary to properly regulate the amount of rotative movement of the spindle and blank in proportion to the extent of longitudinal movement of the table. This I accomplish by providing a series of differently diametered gears which can be substituted for the gears 79 and 80 illustrated. By properly adjusting the stud 82 longitudinally of the slot, and by properly adjusting the arm 84 angularly, the idler gear 82 can be adjusted to properly mesh with whatever gears may have been substituted for the present gears 79 and 80.

I preferably provide a carriage 87 upon which the spindle is mounted, the carriage being movable at an angle to the axis of the spindle. When helical grooves are to be cut, it is necessary to adjust the cutter 19 angularly so that its cutting plane may be parallel with the groove at the point of cutting. I have already stated that the cutter is mounted in the carriage 87, this carriage being supported upon the bracket 28. The bracket 28 may be considered as a motion head provided with means permitting the angular adjustment of the cutter spindle and preferably also with means whereby this angular adjustment may be effected automatically. Rigidly secured to the bracket 28 is a frame or bed plate 86, and movably mounted thereon is the said carriage or swivel plate 87. This swivel plate is provided with front and rear edge portions which are circularly curved, having a common center which lies in the vertical plane of the common axis of the centers 9 and 10. The swivel plate is engaged and held in place by guides or clips 88 and 89 which are similarly curved. The bed 86 is provided with two T-slots 90 and 91 and T-bolts 92 and 93 extend through the swivel plate and respectively enter the T-slots. It will be seen that the construction described permits the swivel plate 87 to be adjusted angularly about a vertical axis lying in the vertical plane of the common axis of the centers 9 and 10. After adjustment the swivel plate may be locked in place by means of the bolts 92 and 93.

Transversely adjustable in suitable guides formed in the swivel plate 87 is a slide 94. This slide is movable under the control of a screw 95. By means of a gib 96 and screws 97 the slide can be locked in adjusted position. Rotatably mounted in suitable bearing apertures in the slide 94 is a spindle 98 which is adapted to carry a mandrel 99 upon which the cutter 19 is mounted. The spindle is mounted in fixed relation to the horizontal top plane of the bracket 28, and hence the spindle and the cutter remain in fixed relation to the horizontal as they are moved upward or downward in the way before described. When the spindle and cutter are horizontal, as shown, they remain so during the upward and downward movement. Preferably, for supporting the outer end of the mandrel there is provided an elbow bar 100 which carries a center 101 adapted to engage the end of the mandrel. The bar 100 is adjustable to accommodate mandrels of different lengths and can be clamped in adjusted position by means of screws 102, 102. It will be seen that by adjusting the slide 94 by means of the screw 95 the cutter may be moved transversely of the blank to establish the proper cooperative relationship. Inasmuch as the slide 94 is mounted on the swivel plate 87 the adjustment of the slide in no way affects the center about which the cutter is angularly adjustable horizontally.

Preferably there is provided a rotary element for moving the swivel plate 87 angularly. As illustrated, there is a worm wheel segment 103 secured to the under side of the plate. The bed 86 is provided with an arcuate groove 104 adapted to receive the segment. This segment meshes with a rotary worm 105 carried by a longitudinal shaft 106 mounted in the bed plate 86. The shaft 106 is provided with a squared end whereby it may be manually turned to adjust the swivel plate angularly.

I have already shown that the machine can be adjusted for cutting grooves in tapered blank or blanks otherwise varying in diameter and that the machine can be used for cutting helical grooves. It will be appreciated, however, that difficulties would ordinarily be encountered in attempting to cut helical grooves in tapered or irregular blanks. When helical grooves are to be cut in tapered or irregular blanks, the manner of cutting must be varied in accordance with variations in the diameter; that is, either the longitudinal pitch of the grooves or the angle of inclination thereof must be varied in accordance with variations in the diameter. I find it preferable to maintain the longitudinal pitch constant, and I therefore provide means whereby the pitch angle may be changed as the diameter of the blank varies. In order to maintain the cutting surface of the cutter in parallelism or tangency with the radial or substantially radial side of the groove at the point of cutting I provide mechanism whereby the horizontal angle of the cutter is automatically made to vary in accordance with variations in the diameter of the blank.

Secured to the main frame is a vertical rack 107 which meshes with a gear 108 rotatably mounted on a stud carried by the bracket 28. The gear 108 meshes with a gear 109 which is mounted on a shaft 110, which shaft is rotatable in a suitable bearing bracket 111 carried by the bracket 28 and has secured to its other end a gear wheel 112. An arm 113 is pivotally mounted concentrically with the shaft 110 and carries two gears 114 and 115 which are mounted on studs adjustable in slots formed longitudinally of the arm. The gear 114 meshes with the gear 112 and also with the gear 115. The gear 115 meshes with a gear 116 which is mounted on a stud on the bed 86 and which also meshes with a gear 117 on the shaft 106. The arm 113 can be locked in adjusted position by means of a clamping screw 118. It will be observed that by means of the train of gearing which has been described the shaft 106 with the worm 105 will be rotated whenever the bracket 28 with the associated parts is raised or lowered. Assuming the bolts 92 and 93 to be loose, the rotation of the worm 105 causes the swivel plate 87 to move and change the angle of the cutter 10. The gearing is so proportioned that the angle is changed at approximately the rate which is necessary in accordance with the variation in the diameter of the blank as represented by the vertical movement of the cutter. It will be seen that inasmuch as the supporting bracket for the cutter moves in paralleism the movement of the cutter is such that its axis is maintained in fixed relation to the horizontal notwithstanding the above described angular movements about a vertical axis. For left-hand helices the cutter must be turned in one direction, and for right-hand helices it must be turned in the other direction. In order to reverse the direction of rotation from that shown, the idler gear 114 is removed and the gear 115 is so adjusted as to mesh not only with the gear 116 but also with the gear 112.

The rate at which the angle of the cutter must be changed depends upon the pitch of the helices, and the required rate of change is less for large pitches than for small pitches. In order that the rate of change may be varied in accordance with the pitch, I provide a series of gears any one of which can be substituted for the gear 112. In this way the rate of turning of the swivel plate 87 and of the cutter may be varied as required.

It will be recalled that automatic means are provided for raising the cutter out of engagement with the blank for the return stroke and for restoring it to normal position for the forward stroke. Because of the gearing connection that has been described, this supplemental raising and lowering of the cutter and of the parts which carry it would tend to supplementally swing the cutter angularly. In many cases it is desirable to vertically lift the cutter from the finished grooves or to vertically lower the cutter to start the grooves. In such cases this supplemental swinging movement of the cutter, taking place after the end of or before the beginning of the normal longitudinal and turning movement of the blank, would cause the cutter to mutilate the desired radial or substantially radial sides of the grooves.

To prevent such supplemental swinging of the cutter I provide two stops 119 and 120 which are adapted to be held in place by T-bolts respectively entering the T-slots 90 and 91. It will be seen that by means of these stops the angular movement of the swivel plate and of the cutter in either direction can be definitely limited. In practice, one or the other of these stops is so located as to engage the swivel plate at the instant when the table 2 reaches the end of its forward stroke. The engagement of the swivel plate with the stop prevents any supplemental swinging movement of the cutter as it is withdrawn from the groove.

In order that the movement of the swivel plate may be stopped at the end of the forward stroke of the table, as just described, there is provided a suitable friction connection in the gearing. As illustrated, the gear 109 is connected with the shaft 110 indirectly through suitable friction disks 121 which are pressed together by springs 122. When the swivel plate is engaged by the limiting stop, slipping takes place at the friction disks.

One of the stops 119 and 120 is adjusted as before stated to limit the swinging movement of the cutter at the end of the forward stroke of the table. In order that the cutter may always be returned to the same angular position for starting the cutting of the successive grooves, the other stop is adjusted to be engaged by the swivel plate at the end of the backward stroke of the table.

I provide a driving mechanism for the cutter spindle 98 which is operative at all times notwithstanding the several possible adjustments and movements of the spindle and associated parts. The spindle 98 carries a spiral gear 123 which meshes with a spiral gear 124 on a vertical shaft 125. This shaft is rotatably mounted at its lower end in a bearing 126 formed in a yoke 127. For supporting the upper end of the shaft 125 there is provided a supplemental bearing 128 formed in a bracket 129 which extends upward from the swivel plate 87. The yoke 127 is provided with a hub concentric with the shaft 125, this hub being pivoted in a suitable aperture in the swivel plate 87. The yoke 127 is also provided with a bearing 130 having its aperture at right angles to the aperture 126. Mounted in this bearing 130 is a horizontal rotatable intermediate shaft 131, and secured respectively to the shafts 125 and 131 are meshing bevel gears 132 and 133.

Projecting from the left-hand side of the bed 86 as viewed in Fig. 3, is a bearing bracket 134. 135 is a yoke provided with a hub 136 which is vertically pivoted in an aperture in the bracket 134. The yoke 135 is also provided with a bearing 137 in which is rotatably mounted a sleeve 138. The aforesaid shaft 131 extends through the central aperture of the sleeve and has a splined connection therewith. The aforesaid hub 136 is provided with a central aperture through which extends a vertical shaft 139. Mounted respectively on the shaft 139 and the sleeve 138 are meshing bevel gears 140 and 141.

It will be seen that when the shaft 139 is rotated the rotative movement will be transmitted to the shaft 131. Inasmuch as the shaft 131 has splined engagement with the sleeve 138 and inasmuch as the shaft is supported at each end by a pivoted yoke, the swivel plate 87 can be freely moved in either direction without interfering with the power connection to the shaft 131. The gear 123 is sufficiently wide to permit longitudinal movement of the slide 94 without disengaging the gear 123 from the gear 124.

Mounted in suitable bearings on the frame 1 is a main drive shaft 142, this being provided with suitable driving means such as cone pulleys 143. Mounted on the main drive shaft 142 is a spiral gear 144 which meshes with a spiral gear 145 formed on a vertical rotatable sleeve 146. The sleeve 146 is rotatably mounted in a bearing bracket secured to the main frame. The aforesaid vertical shaft 139 extends through the sleeve 146 and has splined engagement therewith. By means of the connection described, the shaft 139 and the parts connected therewith are continuously rotated whenever the main drive shaft 142 is rotated. The splined connection between the shaft 139 and the sleeve 146 permits the shaft 139 to be freely raised or lowered with the bed 86 and associated parts without interfering with the power connection.

In order that a series of grooves may be cut in a blank and in order that these grooves may be properly spaced, I provide a suitable indexing mechanism whereby the blank may be turned through a predetermined angle after each cutting operation. The indexing mechanism is preferably automatic and will now be described. Mounted on the spindle 4 is a worm wheel 147 which meshes with a worm 148 on a short transverse shaft 149 carried by the headstock. By means of power applied to the shaft 149 in the manner to be described, indexing is effected. It will be clear, however, that in order to effect indexing, the gear 62 and the parts associated therewith must be disconnected from the spindle; and similarly it will be clear that, in order to turn the spindle during cutting in the way that has been described, the worm wheel 147 must be disconnected from the spindle. In order to alternately make and break the connection between each of these parts and the spindle, I provide a two-part clutch. The worm wheel 147 is rotatable on the spindle and is provided with an annular flange 150. The gear wheel 62 is also rotatable on the spindle and is connected with an annular flange 151. Respectively positioned within the flanges 150 and 151 are metallic expansion rings 152 and 153, held in place by a sleeve 154. Slidable on the sleeve 154 is a grooved collar 159 which carries wedges 155 and 156. As shown clearly in Fig. 11, these wedges are adapted respectively to cooperate with pairs of rocker levers 157 and 158 to expand the rings 152 and 153. When the collar is in central position, as shown, both of the rings are expanded and forced into engagement respectively with the flanges 150 and 151. Thus the worm wheel 147 and the gear 62 are both locked to the spindle. When the collar is moved toward the right, as viewed in Fig. 11, the gear 62 is released from the spindle, and when the collar is moved toward the left the worm wheel 147 is released from the spindle.

A forked lever 160 is connected to a transverse rock shaft 161 mounted on the table 2. The lever is provided with pins which enter the groove of the collar 159. At the front end of the shaft 161 is secured an arm 162 which is provided at its lower end with spiral gear teeth 163. Mounted in suitable bearing brackets at the front end of the main frame is a longitudinal shaft 164 and splined on this shaft is a spiral gear 165. The gear 165 meshes with the teeth 163 on the arm 162 and the gear is positioned between brackets which depend from the table 2 so that the gear is made to travel along the shaft when the table moves. It will be seen that by turning the shaft 164 the arm 162 may be made to turn in one direction or the other as required, thus moving the collar 159 in one direction or the other and releasing either the worm wheel 147 or the gear 62 from the spindle 4. For turning the shaft 164 manually there is provided a handle 166 at the right-hand end of the shaft, as viewed in Fig. 1. At the other end of the shaft is secured a gear wheel 167 which meshes with gear teeth 168 formed on a pivoted arm 169. The arm 169 is pivoted between its ends to the main frame at 170. At its lower end, the arm 169 carries a roller 171 adapted to be engaged by cam members 172 and 173 carried by a cam disk 174 mounted on the shaft 22.

Rotatably mounted in suitable bearing brackets at the front of the main frame is a longitudinal shaft 175. Splined on this shaft is a spiral gear 176 which is positioned between brackets depending from the table 2 so that the gear is made to move along the shaft as the table moves. The spiral gear 176 meshes with a spiral gear 177 on a short transverse shaft 178 carried by the table 2. The shaft 149 carries a gear 179 and the shaft 178 carries a gear 180. Meshing with the said gears 179 and 180 is an idler gear 181 which is mounted on a stud adjustable longitudinally with a slot in an arm 182. This arm is movable about the axis of the shaft 149 and can be clamped in adjusted position by means of a screw 183. It will be seen that through the gearing described the worm wheel 147, together with the spindle 4 and the blank, may be turned whenever the shaft 175 is turned.

Mounted on the shaft 175 at its right hand end is a spiral gear 184. This gear is rotatable on the shaft and is connected therewith by means of friction disks 185 which are pressed together by means of springs 186. The gear 184 meshes with a spiral gear 187 on a vertical shaft 188 which is continuously rotatable, as will be presently described.

Secured to the shaft 175 is a rotatable collar 189 provided with an outward projecting lug 190. Pivotally mounted below the shaft 175 is a lever 191 having a hook portion adapted to engage the lug 190. The lever is normally held in engagement with the lug by means of a spring 192. The engagement of the lug 190 by the lever 191 prevents the shaft 175 from rotating, notwithstanding the continuous rotation of the gear 184. Mounted upon the aforesaid cam disk 174 is a cam member 193 adapted to engage a lug 194 on the lever 191. When the lug is thus engaged the lever is swung so that the lug 190 is disengaged, thus permitting the shaft 75 to be turned by the gear 184 acting through the friction disks 185. By the time the shaft 175 has made a complete revolution, the cam member 193 has disengaged the lug 194, thus permitting the lever 191 to again engage the lug 190. In this way the shaft 175 is caused to make a single revolution at each revolution of the cam disk 174.

The gearing between the shaft 175 and the worm wheel 147 is so proportioned that for each revolution of the shaft 175 the worm wheel is turned through an angle corresponding to the desired angle between two successive grooves in the blank. In order that this angle may be changed as desired, I provide a series of differently diametered gears which can be substituted for either or both of the gears 179 and 180. By using gears of the proper diameters the worm wheel 147 can be turned through any desired angle.

For turning the main cam shaft 22 and for turning the vertical shaft 188, I provide a transverse horizontal intermediate drive shaft 195. This shaft carries a worm 196 which meshes with a worm wheel 197 secured to the cam shaft 22. The shaft 195 also carries a spiral gear 198 which meshes with a spiral gear 199 secured to the shaft 188 near the bottom thereof. The front end of the shaft 195 is preferably squared to receive a wrench so that the shaft can be turned manually when required. Normally, however, the shaft is driven by power.

Mounted in alinement with the shaft 195 is a short shaft 200 carrying a spiral gear 201. The gear 201 meshes with a gear 202 on a shaft 203. This shaft 203 is driven from the main drive shaft 142 by means of a belt which passes over cone pulleys 204 and 205.

Loosely mounted on the shaft 195 is a sleeve carrying a worm wheel 206 which meshes with a worm 207. The worm 207 is mounted on a short longitudinal shaft 208 which is driven from the shaft 203 by means of spur gears 209, 210 and 211.

Splined on the shaft 195 between the gear wheel 201 and the worm wheel 206 is a clutch collar 212 provided at its opposite sides with teeth adapted respectively to mesh with similar teeth formed on the wheels 201 and 206. When the clutch collar is in central position, as shown in Fig. 6, the shaft 195 is idle. When the clutch collar is moved to the right the shaft is connected with the relatively rapidly rotating spiral gear wheel 201 and when the clutch collar is moved to the left the shaft is connected to the relatively slowly moving worm wheel 206.

The clutch collar 212 is movable under the control of a forked lever 213 which is pivoted for movement about a vertical axis and which has connected with it an arm 214 carrying a roller 215. Pivotally mounted adjacent the arm 214 and the roller 215 is a bell-crank lever 216, one arm of which is adapted to cooperate with the arm 214 to move it in one direction or the other. The other arm of the bell-crank lever is adapted to be engaged by shipper dogs 217 and 218 carried by a disk 219 on the cam shaft 22. As the cam shaft 22 is rotated, the shipper dogs 217 and 218 successively engage the bell-crank lever 216, thus moving the arm 214 and through it the clutch collar 212 alternately toward the right and toward the left. In this way the shaft 195 is alternately connected to be driven at high speed by the spiral gear wheel 201 and at low speed by the worm wheel 206.

In order that the clutch collar 212 may be moved to its neutral position manually to stop the machine, a link 220 is connected to the arm 214. Pivoted to the forward end of the link is an arm 221 having a fixed pivot at 222. Pivoted to the arm 221 for movement about an axis parallel to the axis of the link is a handle 223. When the handle is in its left-hand position the link 220 is free to move longitudinally when the arm 214 is moved by the bell-crank lever 216. However, when the handle is moved to its right-hand position, as illustrated in Figs. 1 and 2, it enters a V-shaped notch in a bracket 224, thus maintaining the link 220 and the parts connected therewith in a central neutral position. In this way the rotation of the shaft 195 is stopped and the entire machine is stopped with the exception of the cutter, which continues to rotate. To start the operation again the handle may be swung to the left and the link moved longitudinally, preferably toward the front, thus connecting the shaft 195 with the worm wheel 206.

The shipper dog 217 is so positioned on the disk 219 that it swings the bell-crank lever 216 in the counter-clockwise direction and thus connects the shaft 195 with the worm wheel 206 at the beginning of the forward or cutting stroke of the table 2. This causes the shaft 22 to be rotated relatively slowly, and causes the table to be moved forward relatively slowly for the cutting stroke. At the end of the forward movement of the table the shipper dog 218 engages the bell-crank lever to move it in the clockwise direction and thus connect the shaft 195 with the gear 201. In this way the shaft 22 and the shaft 188 are made to rotate relatively rapidly and the table is caused to have a relatively rapid backward or return movement. The cam disk 174 with the cam members thereon is so located relatively that the indexing takes place during the period when the table is stationary at the end of the backward movement thereof and while the shaft 188 is still rotating rapidly.

I provide means for automatically stopping the machine after a blank has been completely grooved. Formed on the flanged part of the worm wheel 147 is a cam projection 225 adapted to engage an arm 226 on a short rock shaft 227. By means of a spring, the arm 226 is normally held against the flange of the worm wheel. At the other end of the rock shaft 227 is an arm 228 which has a loose pivotal connection with an arm 229 on a rock shaft 230 carried in suitable bearings on the table 2 and on the main frame 1. It will be seen that when the cam projection 225 engages the arm 226 the shaft 230 is turned in the clockwise direction, as viewed in Fig. 6. Carried by the main frame of the machine is a hook member 231 which is adapted to be engaged by a ring 232 at the lower end of a cord 233 which extends to a suitable device for starting and stopping the transmission of power. This device constitutes no part of the present invention and is not shown, but for convenience it can be understood to be a belt shifter controlled by a weight or a spring. When the cord is in its lower position with the ring engaged by the hook as shown in Figs. 5 and 6, power is being transmitted. When the ring is disengaged from the hook the cord is permitted to move upward, thus stopping the transmission of power. Mounted on the rock shaft 230 is a carrier block 234. This block is adjustable along the shaft and can be held in adjusted position by means of a set screw. Pivoted to the block 234 is a spring-pressed dog 235. The block 234 is so positioned on the rock shaft that it is opposite the hook 231 when the table is in its rearmost position as shown in Fig. 2.

When the worm wheel 147 has been indexed through a complete revolution the cam projection 225 swings the lever 226 to the position shown in Fig. 6, thus swinging the rock shaft 230 in the clockwise direction. Inasmuch as the dog 235 is opposite the hook 231, the dog engages the ring 232 and yields against the action of the spring, taking the position shown in Fig. 6. The operation of the machine continues and the cutter proceeds to cut the last groove in the blank. As the table moves forward the dog 235 is carried past the ring and moves outwardly under the influence of the spring. On the following return movement the dog 235, being now in its outer position, engages the ring 232 and pushes it off from the hook 231, thus stopping the machine at the end of the backward stroke. When the operator has taken out the finished blank and put a new one in place, he again starts the machine by pulling on the cord 233. The first operation of the machine is indexing, the worm wheel 147 being turned to a position such that the cam projection 225 disengages the lever 226, permitting the dog 235 to swing away from the hook 231 so that the ring 232 may be freely slipped into place.

In operation, a blank to be grooved is first mounted on the centers 9 and 10 in the usual way and is connected to the spindle 4 to be driven thereby. The operator then adjusts the dogs 26 and 27 so that the table is reciprocated to carry the part of the blank to be grooved past the cutter. If the blank is a cylindrical one the dogs 55 and 56 are either removed or so positioned as not to reciprocate the slide 52. However, if the blank is a tapered one, the taper bar 58 is adjusted at an angle corresponding to the taper of the blank and the dogs 55 and 56 are so adjusted that the slide 52 is reciprocated in synchronism with the table. If the blank is irregular in any way the taper bar 58 is removed and another bar is substituted having a top surface corresponding to the outline of the blank. If it is desired to cut grooves parallel to the axis of the blank, the arm 84 is swung to disconnect the gears 81 and 79, thus permitting the spindle to travel with the carriage without rotative movement. The spindle is suitably locked against accidental rotative movement during cutting, preferably by locking the gear wheel 62. If helical grooves are to be cut, the gears 81 and 79 are brought into mesh after first selecting and putting in place gears of the proper diameters to give the required rotative movement to the spindle. By means of the arm 72 and the gear 71, the helices can be made right-hand or left-hand as required.

If either straight or helical grooves are to be cut in a cylindrical blank, or if straight grooves are to be cut in a blank of varying diameter, the arm 113 is swung to disengage the gear 115 from the gear 116. However, if helical grooves are to be cut in a blank of varying diameter, the arm is swung to engage the gears 115 and 116, the operator having first selected the proper gear 112 to give the rate of cutter movement which is required. As already stated, the cutter must be moved more rapidly for helices with small pitches than for helices with larger pitches. Assuming that right-hand helices are to be cut and that the diameter of the blank increases from right to left, the operator so positions the stop 120 as to stop the movement of the swivel plate 87 in the clockwise direction at the end of the forward movement of the table toward the right; and he so positions the stop 119 as to stop the movement of the swivel plate in the counter-clockwise direction at or near the end of the backward movement of the table toward the left. In this way angular movement of the cutter is prevented during the supplemental raising and lowering movements of the cutter at the end and the beginning of each cutting stroke; and, furthermore, the stops serve to cause the cutter to have the same angular position at the beginning of each cutting stroke notwithstanding the slipping which may have previously taken place at the friction disks.

Next, with the lever 43 swung to the right so that the block 35 and connected parts are carried by the rods 49, the operator, by means of the screw 29, adjusts the bracket 28 and the cutter vertically so as to form cuts of the required depth.

The indexing mechanism is adjusted for securing the proper spacing of the grooves by selecting gears 179 and 180 of proper diameters.

The block 234 is adjusted on the rock shaft 230 so as to lie opposite the hook 231 when the table is in its rearmost position.

Having made the preliminary adjustments already described, the operator starts the machine by pulling on the cord 233 and engaging the ring 232 with the hook 231. Assuming the cam drum 23 to be in the position shown in Figs. 1 and 3, which is the normal stopping position, the table is first held stationary for a brief period, and while it is so held the cam member 172 engages the roller 171 on the lever 169 and, by means of the mechanism which has been described, serves to move the clutch sleeve 154 toward the right as viewed in Figs. 1, 2 and 11. This movement of the clutch sleeve serves to disconnect the gear wheel 62 from the spindle 4 and to connect the worm wheel 147 with the spindle. It will be remembered, however, that the worm wheel is connected with the spindle before the gear wheel is disconnected, thus making it impossible for any free movement of the spindle to take place. As soon as the worm wheel is connected with the spindle, the cam member 193 moves the lever 191 to release the shaft 175 and permit it to turn through one revolution under the influence of the gear wheel 184. In this way the spindle 4 with the blank is indexed through the required angle to place the blank in position for the next cut. As soon as the indexing is complete the cam element 173 engages the roller 171 to move the lever 169 in the other direction and to move the clutch sleeve in the other direction. This movement disconnects the worm wheel 147 from the sleeve and connects the gear wheel 62 therewith. It will be understood that here also the connection with the gear wheel is complete before the connection with the worm wheel is broken, thus preventing any free movement of the spindle.

When the spindle is again connected with the gear wheel 62, the cam element 47 moves the lever 43 toward the right, thus turning the shaft 35 and restoring the bracket 28 and the cutter to their lowermost positions as determined by the limit rods 49. The indexing and other operations have taken place with the cam shaft 22 and other parts moving at relatively high speed, the shaft 195 being connected to the gear 201. At this point, however, the shipper dog 217 engages the bell-crank lever 216 and the shaft 195 is connected to the worm wheel 206.

The rotation of the cam 23 then causes the slide 21 to move forward, carrying with it the table 2 and the slide 52. During this forward movement, the shaft 195 and all of the parts connected therewith, including the cam drum 23, move relatively slowly; and the blank is brought into engagement with the continuously rotating cutter and a groove is cut. The blank is or may be turned to form a right-hand or left-hand spiral groove as already described; and the cutter may be raised or lowered during the cutting operation to conform to variations in the diameter of the blank. For spiral cutting the cutter may be swung to conform to variations in the pitch angle when the diameter varies.

At the conclusion of the forward stroke of the table the shaft 195 is disconnected from the worm wheel 206 and is connected with the spiral gear 201 by means of the shipper dog 218 which engages the bell-crank lever 216. The shaft now rotates at a relatively high speed, and the cam drum 23 acts to return the slide 21 together with the table 2 and the slide 52 to their rearmost positions. The cam member 46 on the drum 45 moves the lever 43 toward the left, thus elevating the cutter in the way that has been described. As already stated, this elevation of the cutter is effected in order to prevent any marring or supplemental cutting along the lines of the groove already cut. This is particularly necessary for spiral cutting, when, owing to lost motion or back-lash, the cutter would not follow exactly the same relative course during the backward movement. The extent to which the cutter is elevated can be varied as required by properly adjusting the cam member 46. The stops 119 and 120, when used, serve to prevent angular movement of the cutter when it is being lifted at the end of the cutting stroke or lowered at the beginning thereof.

Following the backward movement of the table indexing again takes place and the series of operations already described is repeated.

When the spindle has been indexed through a complete revolution, the cam projection 225 on the worm wheel 147 engages the lever 226 and moves the dog 235 outward to the position shown in Fig. 6. On the return movement following the completion of the next cut the dog 235 disengages the ring 232 from the hook 231, thus releasing the cord 233 and stopping the machine. The operator then removes the completely grooved blank and puts another blank in place, after which he starts the machine simply by pulling on the cord 233 and engaging the ring with the hook. The operation then continues automatically as already described until the next blank is finished.

The construction heretofore described for stopping the operation of the machine acts automatically after a predetermined number of traverse movements of the cutter. This stopping takes place when the cutter is at a predetermined part of its path of traverse, that is, in its upper position. Inasmuch as the rotary movements of the cutter and the traverse and feed movements thereof are all effected from the same source of power and inasmuch as the feed and traverse movements are effected in a definite cycle by the gearing and other power transmitting devices, it will be clear that there is a definite relation between the traverse and feed movements and the number of rotations of the cutter. Therefore, when the operation of the machine is stopped after a predetermined number of traverse and feeding movements the stopping obviously takes place after a predetermined number of cutter rotations.

It will further be clear that the rate of spindle motion may be varied in relation to the rate of traverse. This variation may be effected either by adjusting the taper bar or guide member 58 or by moving the drive belt on the cone pulleys 204 and 205.

What I claim is:

1. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and means supplemental to and operable independently of the last said means for also raising and lowering the said support along the said guideways.

2. In a milling machine, the combination of a longitudinally movable work table, a support for the work table, mechanism for reciprocating the table along its support, a rotatable milling cutter positioned adjacent the table and fixed against longitudinal movement, a support for the cutter, means including a screw for adjusting the cutter relatively to its support and transversely of the direction of table movement, fixed vertical guideways engaging one of the said supports, means for raising and lowering the last said support along the said guideways, and means supplemental to and operable independently of the last said means for also raising and lowering the said support along the said guideways.

3. In a machine of the class described, the combination of a longitudinally movable work table, a support for the work table, mechanism for reciprocating the table along its support, a rotatable cutter positioned adjacent the table and fixed against longitudinal movement, a support for the cutter, fixed vertical guideways engaging one of the said supports, a screw for raising and lowering the last said support along the said guideways, and means including a cam supplemental to and operable independently of the last said means for also raising and lowering the said support along the said guideways.

4. In a machine of the class described, the combination of a longitudinally movable work table, a support for the work table, mechanism for reciprocating the table along its support, a rotatable cutter positioned adjacent the table and fixed against longitudinal movement, a support for the cutter, a screw for raising and lowering one of the said supports, and means including a cam and a rack and pinion supplemental to and operable independently of the screw for raising and lowering one of the said supports.

5. In a milling machine, the combination of a longitudinally movable work table, a support for the work table, mechanism for reciprocating the table along its support, a rotatable milling cutter positioned adjacent the table and fixed against longitudinal movement, a support for the cutter, and two independently operable devices for raising and lowering one of the said supports, the said devices being connected together so that one of them is bodily movable by the other.

6. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, and two independently operable devices for raising and lowering the last said support along the said guideways, the said devices being connected together so that one of them is bodily movable by the other.

7. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, a screw for raising and lowering the last said support along the said guideways, and supplemental means connected with the screw but operating independently of the threads thereof for also raising and lowering the said support along the guideways.

8. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, two independently operable devices for raising and lowering the last said support along the said guideways, the said devices being connected together so that one of them is bodily movable by the other, and means supplemental to both of the said devices for holding the last said support in the position to which it is moved.

9. In a milling machine, the combination of a longitudinally movable work table, a support for the work table, automatic mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and automatic means supplemental to and operable independently of the last said means for raising and lowering the said support along the said guideways in timed relation to the table reciprocation.

10. In a milling machine, the combination of a longitudinally movable work table, a support for the work table, automatic mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and automatic means supplemental to and operable independently of the last said means for raising the said support at one end of the table movement and for lowering it at the other end.

11. In a milling machine, the combination of a longitudinally movable work table, a support for the work table, automatic mechanism for reciprocating the table along its support, a rotatable milling cutter positioned adjacent the table and fixed against longitudinal movement, a support for the cutter, fixed vertical guideways engaging one of the said supports, a manually operable screw for raising and lowering the last said support along the said guideways, and automatic means supplemental to and operable independently of the screw for raising and lowering the said support along the said guideways in timed relation to the table reciprocation.

12. In a milling machine, the combination of a longitudinally movable work table, a support for the work table, automatic mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, automatic means supplemental to and operable independently of the last said means for raising and lowering the said support along the said guideways in timed relation to the table reciprocation, and means supplemental to both of the said means for holding the last said support in the position to which it is moved by the said automatic means.

13. In a machine of the class described, the combination of a longitudinally movable work table, a support for the work table, a rotatable cutter positioned adjacent the table and fixed against longitudinal movement, a support for the cutter, a screw for raising and lowering one of the said supports, two coaxial rotary cams, means engaging one cam for reciprocating the work table, and means engaging the other cam for raising and lowering one of the said supports, the last said means being supplemental to the aforesaid raising and lowering screw.

14. In a milling machine, the combination of a longitudinally movable work table, a support for the work table, a rotatable milling cutter positioned adjacent the table and fixed against longitudinal movement, a support for the cutter, fixed vertical guideways engaging one of the said supports, means for raising and lowering the last said support along the said guideways, two cams positioned immediately beneath the table and rotatable about a common horizontal axis in fixed relation to the table support, means engaging one cam for reciprocating the work table, and means engaging the other cam for raising and lowering the said vertically movable support along the said guideways, the last said means being supplemental to the aforesaid raising and lowering means.

15. In a milling machine, the combination of a longitudinally movable work table, a support for the work table, a rotatable milling cutter positioned adjacent the table and fixed against longitudinal movement, a support for the cutter, fixed vertical guideways engaging one of the said supports, means for raising and lowering the last said support along the said guideways, two cams positioned immediately beneath the table and rotatable about a common horizontal axis in fixed relation to the table support, a stud on the table engaging one cam for reciprocating the said table, and mechanism engaging the other cam and including a rack and pinion for raising and lowering the said vertically movable support along the said guideways, the last said mechanism being supplemental to the aforesaid raising and lowering means.

16. In a milling machine, the combination of a longitudinally movable work table, a support for the work table, a rotatable milling cutter positioned adjacent the table and fixed against longitudinal movement, a support for the cutter, fixed vertical guideways engaging one of the said supports, a manually operable screw for raising and lowering the last said support along the said guideways, two cams positioned immediately beneath the table and rotatable about a common horizontal axis in fixed relation to the table support, a stud on the table engaging one cam for reciprocating the said table, and mechanism engaging the other cam for raising and lowering the said vertically movable support along the said guideways, the last said mechanism being supplemental to the said screw and bodily movable in part thereby.

17. In a milling machine, the combination of a longitudinally movable work table, a support for the work table, a rotatable milling cutter positioned adjacent the table and fixed against longitudinal movement, a support for the cutter, fixed vertical guideways engaging one of the said supports, a manually operable screw for raising and lowering the last said support along the said guideways, two cams positioned immediately beneath the table and rotatable about a common horizontal axis in fixed relation to the table support, a stud on the table engaging one cam for reciprocating the said table, mechanism engaging the other cam and including a rack and pinion for raising and lowering the said vertically movable support along the said guideways, the last said mechanism being supplemental to the aforesaid screw, and means supplemental to the screw and to the cam operated raising and lowering means for holding the said support in the position to which it is moved by the cam operated means.

18. In a machine of the class described, the combination of a bed having horizontal guideways on the top and also having external vertical guideways below the level of the horizontal guideways, a work table on the bed movable along the horizontal guideways on the top of the bed, a vertically movable knee engaging the vertical guideways on the bed and movable therealong, and a rotatable cutter spindle mounted on the vertically movable knee and bodily movable arcuately with respect thereto about an axis that is in fixed relation to the knee, the said spindle projecting in a generally horizontal direction from the knee so as to be adapted to hold a rotary cutter in operative relation to work on the table.

19. In a milling machine, the combination of a reciprocating work table, a cutter frame, a cutter rotatably mounted on the frame and positioned above the table, and automatic means for raising the frame and cutter vertically in parallelism after each cutting stroke of the table and for lowering them vertically in parallelism before the next cutting stroke.

20. In a milling machine, the combination of a reciprocating work table, a cutter frame, a cutter rotatably mounted on the frame and positioned above the table, means carried by the table for holding a work blank and for turning it in synchronism with the table reciprocations to cause the cutting of helical grooves, automatic means for indexing the blank between cutting strokes, and automatic means for raising the frame and cutter vertically in parallelism after each cutting stroke of the table and for lowering them vertically in parallelism before the next cutting stroke.

21. In a milling machine, the combination of a reciprocating work table, a cutter frame, a cutter rotatably mounted on the frame and positioned above the table, automatic means for raising the frame and cutter vertically in parallelism after each cutting stroke of the table and for lowering them vertically in parallelism before the next cutting stroke, a bodily fixed drive shaft for the cutter, and a train of gearing and shafting connecting the drive shaft with the cutter and permitting the vertical movement of the latter.

22. In a milling machine, the combination of a reciprocating work table, a cutter frame, a cutter rotatably mounted on the frame and positioned above the table, means whereby the cutter may be angularly adjusted horizontally with respect to the frame, and automatic means for raising the frame vertically in parallelism after each cutting stroke of the table and for lowering it vertically in parallelism before the next cutting stroke.

23. In a milling machine, the combination of a reciprocating work table, a rotatable cutter positioned above the table, automatic means for raising the cutter after each cutting stroke of the table and for lowering it before the next cutting stroke, and means for adjusting the extent of upward movement without changing the limit of downward movement.

24. In a milling machine, the combination of a reciprocating work table, a rotatable cutter positioned above the table, automatic means for raising the cutter after each cutting stroke of the table and for lowering it before the next cutting stroke, means for adjusting the extent of upward movement without changing the limit of downward movement, and means carried by the table for rotatably holding a work blank and for automatically indexing it between cutting strokes.

25. In a milling machine, the combination of a reciprocating work table, a rotatable cutter positioned above the table, and automatic means including a cam for raising the cutter after each cutting stroke of the table and for lowering it before the next cutting stroke, the said cam being adjustable to change the extent of upward movement without changing the limit of downward movement.

26. In a milling machine, the combination of a reciprocating work table, a rotatable cutter positioned above the table, a screw adapted to move the cutter vertically, and automatic means including a cam drum and oppositely inclined cam members thereon for turning the screw after each cutting stroke of the table to raise the cutter and for turning it before the next cutting stroke to lower the cutter.

27. In a milling machine, the combination of a reciprocating work table, a rotatable cutter positioned above the table, a screw adapted to move the cutter vertically, automatic means including a cam drum and oppositely inclined cam members thereon for turning the screw after each cutting stroke of the table to raise the cutter and for turning it before the next cutting stroke to lower the cutter, and means for adjusting one of the cam members independently of the other to change the extent to which the cutter is raised.

28. In a milling machine, the combination of a reciprocating work table, a rotatable cutter positioned above the table, a screw adapted to move the cutter vertically, a gear wheel connected with the screw, a segmental gear meshing with the gear wheel, and cam elements for moving the segmental gear in one direction after each cutting stroke of the table and for moving the segmental gear in the other direction before the next cutting stroke of the table whereby the cutter is alternately raised and lowered by the screw.

29. In a milling machine, the combination of a reciprocating work table, a cutter frame, a cutter rotatably mounted on the frame and positioned above the table, automatic means including a screw for raising the frame and cutter vertically in parallelism after each cutting stroke of the table and for lowering them vertically in parallelism before the next cutting stroke, and means supplemental to the screw for limiting the downward movement of the cutter.

30. In a milling machine, the combination of a reciprocating work table, a rotatable cutter positioned above the table, a screw adapted to move the cutter vertically, a gear wheel connected with the screw, a segmental gear meshing with the gear wheel, cam elements for moving the segmental gear in one direction after each cutting stroke of the table and for moving the segmental gear in the other direction before the next cutting stroke of the table whereby the cutter is alternately raised and lowered by the screw, and means supplemental to the screw for limiting the downward movement of the cutter.

31. In a milling machine, the combination of a reciprocating work table, a rotatable cutter positioned above the table, automatic means for raising the cutter after each cutting stroke of the table and lowering it before the next cutting stroke, and means independent of the said automatic means for moving the cutter vertically to change the depth of cut.

32. In a milling machine, the combination of a reciprocating work table, a rotatable cutter positioned above the table, means carried by the table for rotatably holding a work blank and for automatically indexing it between cutting strokes, automatic means for raising the cutter after each cutting stroke of the table and for lowering it before the next cutting stroke, and means independent of the said automatic means for moving the cutter vertically to change the depth of cut.

33. In a milling machine, the combination of a reciprocating work table, a rotatable cutter positioned above the table, automatic means for raising the cutter after each cutting stroke of the table and for lowering it before the next cutting stroke, and means including a screw independent of the said automatic means for moving the cutter vertically to change the depth of cut.

34. In a milling machine, the combination of a reciprocating work table, a rotatable cutter positioned above the table, a screw adapted to move the cutter vertically, automatic means for turning the screw after each cutting stroke of the table to raise the cutter and for turning it before the next cutting stroke to lower the cutter, and a second screw operable independently of the first screw and adapted to move the cutter vertically to change the depth of cut.

35. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and supplemental means connected to operate automatically in unison with the table and independently of the last said means to raise and lower the said support along the said guideways while the table is being moved.

36. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and supplemental means including a cam movable in proportion to the table movement and acting independently of the last said means to raise and lower the said support along the said guideways in predetermined relation to the table movement.

37. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and means connected to operate automatically in unison with the table to raise and lower the said support along the said guideways while the table is being moved, the last said means acting independently of the first said means but being connected therewith so that one of the said means is bodily movable by the other.

38. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and means including a cam movable in proportion to the table movement to raise and lower the support along the said guideways in predetermined relation to the table movement, the last said means acting independently of the first said means but being connected therewith so that one of the said means is bodily movable by the other.

39. In a milling machine, the combination of a longitudinally movable work table, a support for the work table, mechanism for reciprocating the table along its support, a rotatable milling cutter positioned adjacent the table and fixed against longitudinal movement, a support for the cutter, fixed vertical guideways engaging one of the said supports, means for raising and lowering the last said support along the said guideways, and means including a cam mounted on the table support independently of the table and movable in proportion to the table movement to raise and lower the support along the said guideways in predetermined relation to the table movement, the last said means acting independently of the first said means but being connected therewith so that one of the said means is bodily movable by the other.

40. In a milling machine, the combination of a longitudinally movable work table, a support for the work table, a rotatable milling cutter positioned adjacent the table and fixed against longitudinal movement, a support for the cutter, fixed vertical guideways engaging one of the said supports, means for raising and lowering the last said support along the said guideways, two cams connected to operate in unison, means engaging one cam for reciprocating the table, and means engaging the other cam for raising and lowering the last said support along the said guideways in predetermined relation to the table movement, the last said raising and lowering means acting independently of the first said means but being connected therewith so that one of the said means is bodily movable by the other.

41. In a milling machine, the combination of a movable work table, a support for the work table, a rotatable milling cutter positioned adjacent the table and fixed against movement in the direction of table movement, a support for the cutter, means permanently connected with one of the supports for moving it vertically, a second means operable independently of the first means and permanently connected with one of the supports for moving it vertically, and a third means operable independently of both the first and second means and permanently connected with one of the supports for moving it vertically.

42. In a milling machine, the combination of a movable work table, a support for the work table, a rotatable milling cutter positioned adjacent the table and fixed against movement in the direction of table movement, a support for the cutter, fixed vertical guideways engaging one of the said supports, two independently operable means permanently connected with the last said support for moving it vertically along the said guideways, and a third means operable independently of both the two first said means and permanently connected with one of the supports for moving it vertically.

43. In a milling machine, the combination of a movable work table, a support for the work table, a rotatable milling cutter positioned adjacent the table and fixed against movement in the direction of table movement, a support for the cutter, fixed vertical guideways engaging one of the said supports, and three independently operable means permanently connected with the last said support for moving it vertically along the said guideways.

44. In a milling machine, the combination of a movable work table, a support for the work table, a rotatable milling cutter positioned adjacent the table and fixed against movement in the direction of table movement, a support for the cutter, fixed vertical guideways engaging one of the said supports, and three independently operable devices for raising and lowering the last said support along the said guideways, the said devices being connected together in series so that the first of them is bodily movable by the second and third and so that the second is bodily movable by the third.

45. In a milling machine, the combination of a longitudinally movable work table, a support for the work table, a rotatable milling cutter positioned adjacent the table and fixed against longitudinal movement, a support for the cutter, automatic means permanently connected with one of the supports for moving it vertically while the table is moving and in predetermined relation to the table movement, a second automatic means operable independently of the first means and permanently connected with one of the supports for raising it at one end of the table movement and for lowering it at the other end, and a third means operable independently of both the first and second means and permanently connected with one of the supports for moving it vertically.

46. In a milling machine, the combination of a longitudinally movable work table, a support for the work table, a rotatable milling cutter positioned adjacent the table and fixed against longitudinal movement, a support for the cutter, fixed vertical guideways engaging one of the supports, automatic means permanently connected with the last said support for moving it vertically along the said guideways while the table is moving and in predetermined relation to the table movement, a second automatic means operable independently of the first means and permanently connected with the last said support for raising it at one end of the table movement and for lowering it at the other end, and a third means operable independently of both the first and second means and permanently connected with one of the supports for moving it vertically.

47. In a milling machine, the combination of a longitudinally movable work table, a support for the work table, a rotatable milling cutter positioned adjacent the table and fixed against longitudinal movement, a support for the cutter, automatic means permanently connected with one of the supports for moving it vertically while the table is moving and in predetermined relation to the table movement, a second automatic means operable independently of the first means and permanently connected with one of the supports for raising it at one end of the table movement and for lowering it at the other end, and a third means operable independently of both the first and second means and permanently connected with the last said support for moving it vertically.

48. The combination in a milling machine, of a longitudinally movable work table, a rotatable cutter positioned adjacent the table and fixed against longitudinal movement, means on the table for holding and turning a blank, and means for moving the cutter toward and from the blank axis while maintaining the cutter axis in fixed angular relationship with the direction of the said movement, the movement being effected in predetermined timed relation with the table movement whereby the cutter is made to follow predetermined variations in the diameter of the blank.

49. The combination in a milling machine, of a longitudinally reciprocating work table, a rotatable cutter fixed against longitudinal movement and positioned adjacent the table with its axis transverse of the direction of table movement, means on the table for holding a work blank for turning it in synchronism with the table reciprocations to cause the cutting of helical grooves, means for indexing the blank between cutting strokes, and means for moving the cutter toward and from the blank axis while maintaining the cutter axis in fixed angular relationship with the direction of the said movement, the movement being effected in predetermined timed relation with the table movement whereby the cutter is made to follow predetermined variations in the diameter of the blank.

50. The combination in a milling machine, of means for holding and turning a blank, a rotatable cutter, means for effecting relative longitudinal movement between the blank and the cutter, and a guide member movable longitudinally in timed relation with the said relative longitudinal movement for moving the cutter toward and from the blank axis while maintaining the cutter axis in fixed angular relationship with the direction of the said movement.

51. The combination in a milling machine, of means for holding and turning a blank, a rotatable cutter, means for effecting relative longitudinal movement between the blank and the cutter, and a guide member movable longitudinally in timed relation with the said relative longitudinal movement but through a different distance, the said guide member serving to move the cutter toward and from the blank axis while maintaining the cutter axis in fixed angular relationship with the direction of the said movement.

52. The combination in a milling machine, of a longitudinally movable work table, means on the table for holding and turning a blank, a rotatable cutter positioned above the table and fixed against longitudinal movement, and a movable guide member for raising and lowering the cutter vertically in fixed relation to the horizontal and in timed relation with the table movement whereby the cutter is made to follow predetermined variations in the diameter of the blank.

53. The combination in a milling machine, of a longitudinally reciprocating work table, a rotatable cutter positioned above the table and fixed against longitudinal movement, means on the table for rotatably supporting a work blank to be grooved and for indexing it between cutting strokes, and a movable guide member for raising and lowering the cutter vertically in fixed relation to the horizontal and in timed relation with the table movement whereby the cutter is made to follow variations in the diameter of the blank.

54. The combination in a milling machine, of a longitudinally movable work table, means on the table for holding and turning a blank, a rotatable cutter positioned above the table and fixed against longitudinal movement, a movable taper bar for raising and lowering the cutter in timed relation with the table movement whereby the cutter is made to follow variations in the diameter of the blank, and means movable with the taper bar for adjusting it to change the rate at which the cutter is raised and lowered.

55. The combination in a milling machine, of a longitudinally movable work table, means on the table for holding and turning a blank, a rotatable cutter positioned above the table and fixed against longitudinal movement, a movable guide member for raising and lowering the cutter vertically in fixed relation to the horizontal, and means for moving the guide member in timed relation with the table movement but through a different distance whereby the cutter is made to follow variations in the diameter of the blank.

56. The combination in a milling machine, of a longitudinally movable work table, means on the table for holding and turning a blank, a rotatable cutter positioned above the table and fixed against longitudinal movement, a movable guide member for raising and lowering the cutter in timed relation with the table movement whereby the cutter is made to follow predetermined variations in the diameter of the blank, and means for changing the extent of movement of the guide member without changing the extent of movement of the table.

57. The combination in a milling machine, of a longitudinally movable work table, means on the table for holding and turning a blank, a rotatable cutter positioned above the table and fixed against longitudinal movement, a longitudinally reciprocating slide, means for imparting longitudinal reciprocation from the slide to the table, a longitudinally movable guide member for raising and lowering the cutter, and means independent of the table for imparting longitudinal reciprocation from the slide to the guide member in timed relation with the table reciprocation whereby the cutter is made to follow predetermined variations in the diameter of the blank.

58. The combination in a milling machine, of a longitudinally movable work table, means on the table for holding and turning a blank, a rotatable cutter positioned above the table and fixed against longitudinal movement, a longitudinally reciprocating slide, adjustable means interposed between the slide and the table for imparting reciprocation of any desired extent from the former to the latter, a longitudinally movable guide member for raising and lowering the cutter, and adjustable means supplemental to the last said means interposed between the slide and the guide member for imparting reciprocation of any desired extent from the former to the latter in timed relation with the table reciprocation whereby the cutter is made to follow predetermined variations in the diameter of the blank.

59. The combination in a milling machine, of a longitudinally movable work table, a rotatable cutter positioned adjacent the table and fixed against longitudinal movement, means on the table for holding and turning a blank, means for moving the cutter toward and from the blank axis while maintaining the cutter axis in fixed angular relationship with the direction of the said movement, the movement being effected in predetermined timed relation with the table movement whereby the cutter is made to follow predetermined variations in the diameter of the blank, and automatic means independent of the last said means for raising the cutter out of cutting relation with the blank after each cutting stroke of the table and for restoring it to cutting relation with the blank before the next cutting stroke of the table.

60. The combination in a milling machine, of a longitudinally movable work table, a rotatable cutter positioned adjacent the table and fixed against longitudinal movement, means on the table for holding and turning a blank, means for moving the cutter toward and from the blank axis while maintaining the cutter axis in fixed angular relationship with the direction of the said movement, the movement being effected in predetermined timed relation with the table movement whereby the cutter is made to follow predetermined variations in the diameter of the blank, automatic means independent of the last said means for raising the cutter out of cutting relation with the blank after each cutting stroke of the table and for restoring it to cutting relation with the blank before the next cutting stroke of the table, and means independent of the said automatic means for moving the cutter vertically to change the depth of cut.

61. The combination in a milling machine, of a longitudinally reciprocating work table, means on the table for holding a blank to be grooved, a rotatable cutter positioned above the table and fixed against longitudinal movement, means for raising and lowering the cutter in timed relation with the table movement whereby the cutter is made to follow variations in the diameter of the blank, and means independent of the last said means for moving the cutter vertically to change the depth of cut.

62. The combination in a milling machine, of a longitudinally reciprocating work table, means on the table for holding a blank to be grooved, a rotatable cutter positioned above the table and fixed against longitudinal movement, a screw supporting the cutter and adjustable to move the cutter vertically and thereby change the depth of cut, and means for raising and lowering the screw and the cutter in timed relation with the table movement whereby the cutter is made to follow variations in the diameter of the blank.

63. The combination in a milling machine, of a longitudinally reciprocating work table, means on the table for holding a blank to be grooved, a rotatable cutter positioned above the table and fixed against longitudinal movement, means for raising and lowering the cutter in timed relation with the table movement whereby the cutter is made to follow variations in the diameter of the blank, and automatic means independent of the last said means for raising the cutter out of cutting relation with the blank after each cutting stroke of the table and for restoring it to cutting relation with the blank before the next cutting stroke of the table.

64. The combination in a milling machine, of a longitudinally reciprocating work table, means on the table for holding a blank to be grooved, a rotatable cutter positioned above the table and fixed against longitudinal movement, a screw supporting the cutter, means for raising and lowering the screw and the cutter in timed relation with the table movement whereby the cutter is made to follow variations in the diameter of the blank, and automatic means for turning the screw to raise the cutter out of cutting relation with the blank after each cutting stroke of the table and for turning the screw to restore the cutter to cutting relation with the blank before the next cutting stroke of the table.

65. The combination in a milling machine, of a longitudinally reciprocating work table, means on the table for holding a blank to be grooved, a rotatable cutter positioned above the table and fixed against longitudinal movement, means for raising and lowering the cutter in timed relation with the table movement whereby the cutter is made to follow variations in the diameter of the blank, means independent of the last said means for moving the cutter vertically to change the depth of cut, and automatic means independent of the last two said means for raising the cutter out of cutting relation with the blank after each cutting stroke of the table and for restoring it to cutting relation with the blank before the next cutting stroke of the table.

66. The combination in a milling machine, of a longitudinally reciprocating work table, means on the table for holding a blank to be grooved, a rotatable cutter positioned above the table and fixed against longitudinal movement, a screw supporting the cutter and adjustable to move the cutter vertically and thereby change the depth of cut, a second screw supporting the first screw and thereby supporting the cutter, means for raising and lowering both screws and the cutter in timed relation with the table movement whereby the cutter is made to follow variations in the diameter of the blank, and automatic means for turning the second screw to raise the cutter out of cutting relation with the blank after each cutting stroke of the table and for turning the second screw to restore the cutter to cutting relation with the blank before the next cutting stroke of the table.

67. In combination, a longitudinally movable work table, a rotatable longitudinal blank carrying spindle on the table, a swivel plate fixed against movement longitudinally of the table and angularly adjustable about a vertical axis passing through the axis of the spindle, a support for the swivel plate positioned entirely at one side of said axis of adjustment and at one side of the spindle axis, the said swivel plate and the support therefor having contacting relatively slidable arcuate bearing surfaces positioned entirely at one side of the said axes whereby the swivel plate is angularly adjustable about the said vertical axis passing through the axis of the spindle, and a cutter carried by the swivel plate and adapted to engage a blank.

68. In combination, a longitudinally movable work table, a rotatable longitudinal blank carrying spindle on the table, a swivel plate fixed against movement longitudinally of the table and angularly adjustable about a vertical axis passing through the axis of the spindle, a support for the swivel plate positioned entirely at one side of the said axis of adjustment and at one side of the spindle axis, the said swivel plate and the support therefor having contacting relatively slidable arcuate bearing surfaces positioned entirely at one side of the said axes whereby the swivel plate is angularly adjustable about the said vertical axis passing through the axis of the spindle, a cutter carried by the swivel plate and adapted to engage a blank, and means for adjusting the cutter relatively to the swivel plate transversely of the spindle.

69. In combination, a longitudinally movable work table, a rotatable longitudinal blank carrying spindle on the table, a swivel plate supported entirely at one side of the spindle axis and fixed against movement longitudinally of the table, the said swivel plate being angularly adjustable about a vertical axis passing through the axis of the blank carrying spindle, means for bodily moving the swivel plate vertically and a cutter carried by the swivel plate and adapted to engage a blank.

70. In combination, a longitudinally movable work table, a rotatable longitudinal blank carrying spindle on the table, a swivel plate supported entirely at one side of the spindle axis and fixed against movement longitudinally of the table, the said swivel plate being angularly adjustable about a vertical axis passing through the axis of the blank carrying spindle, means for bodily moving the swivel plate vertically, a cutter carried by the swivel plate and adapted to engage a blank, and means for adjusting the cutter relatively to the swivel plate transversely of the spindle.

71. In combination, a longitudinally movable work table, a rotatable longitudinal blank carrying spindle on the table, a swivel plate supported and positioned entirely at one side of the spindle axis and fixed against movement longitudinally of the table, the said plate being angularly adjustable about a vertical axis passing through the axis of the spindle, a cutter carried by the swivel plate and adapted to engage a blank, means for adjusting the cutter relatively to the swivel plate transversely of the spindle, a bodily fixed drive shaft for the cutter, and a train of gearing and shafting connecting the drive shaft with the cutter and permitting the aforesaid movements thereof.

72. In combination, a longitudinally movable work table, a rotatable longitudinal blank carrying spindle on the table, a swivel plate supported entirely at one side of the spindle axis and fixed against movement longitudinally of the table, the said swivel plate being angularly adjustable about a vertical axis passing through the axis of the blank carrying spindle, means for bodily moving the swivel plate vertically, a cutter carried by the swivel plate and adapted to engage a blank, means for adjusting the cutter relatively to the swivel plate transversely of the spindle, a bodily fixed drive shaft for the cutter, and a train of gearing and shafting connecting the drive shaft with the cutter and permitting the aforesaid movements thereof.

73. In combination, a longitudinally movable work table, a rotatable longitudinal blank carrying spindle on the table, a swivel plate fixed against movement longitudinally of the table and angularly adjustable about a vertical axis passing through the axis of the blank carrying spindle, a transverse cutter spindle rotatable on the swivel plate, a cutter on the cutter spindle adapted to engage the blank, means for adjusting the cutter spindle relatively to the swivel plate transversely of the blank, a vertical spiral gear on the swivel plate, a driving connection for the spiral gear operable for all positions of the swivel plate, and a second spiral gear on the cutter spindle and meshing with the first spiral gear, the width of the last said gear being sufficient to permit endwise adjustment of the spindle without disturbing the meshing of the gears.

74. In a machine of the class described, the combination of a bed having horizontal guideways on the top and also having external vertical guideways below the level of the horizontal guideways, a work table on the bed movable along the horizontal guideways on the top of the bed, automatic means for reciprocating the table along the said guideways, a vertically movable knee engaging the vertical guideways on the bed and movable therealong, a rotatable cutter spindle mounted on the vertically movable knee and bodily movable with respect thereto, the said cutter projecting in a generally horizontal direction from the knee so as to be adapted to hold a rotary cutter in operative relation to work on the reciprocable table, and automatic means for moving the cutter with respect to the knee while the table is in motion.

75. In a machine of the class described, the combination of a bed having horizontal guideways on the top and also having external vertical guideways below the level of the horizontal guideways, a work table on the bed movable along the horizontal guideways on the top of the bed, automatic means for reciprocating the table along the said guideways, a vertically movable knee engaging the vertical guideways on the bed and movable therealong, a rotatable cutter spindle mounted on the vertically movable knee and bodily movable arcuately with respect thereto about an axis that is normally in fixed relation to the knee, the said cutter projecting in a generally horizontal direction from the knee so as to be adapted to hold a rotary cutter in operative relation to work on the reciprocable table, and automatic means for moving the cutter with respect to the knee and about the said axis while the table is in motion.

76. A milling machine comprising in combination, means for holding and rotating a blank, a milling cutter, means for effecting a relative longitudinal movement between the blank and the cutter to cut a helical groove, means for relatively moving the cutter and blank toward or from each other during cutting in conformity with variations in the diameter of the blank, and automatic means for supplementally varying the relationship between the cutter and the blank during cutting in accordance with variations in the diameter of the blank.

77. A milling machine comprising in combination, means for holding and rotating a blank, a milling cutter, means for effecting a relative longitudinal uniform movement between the blank and the cutter to cut a helical groove, means for relatively moving the cutter and blank toward or from each other during cutting in conformity with variations in the diameter of the blank, and automatic means for effecting a relative angular movement between the cutter and the blank during cutting in accordance with variations in the angle of inclination of the groove.

78. A milling machine comprising in combination, means for holding and rotating a blank, a milling cutter, means for effecting a relative longitudinal uniform movement between the blank and the cutter to cut a helical groove, means for relatively moving the cutter and blank toward or from each other during cutting in conformity with variations in the diameter of the blank, and automatic means for angularly moving the cutter during cutting in accordance with variations in the angle of inclination of the groove.

79. A milling machine comprising in combination, means for reciprocating and simultaneously rotating a blank, a milling cutter adapted to engage the blank to cut a helical groove, means for moving the cutter toward or from the blank during cutting in conformity with variations in the diameter of the blank, and automatic means for angularly moving the cutter during cutting in accordance with variations in the angle of inclination of the groove.

80. A milling machine comprising in combination, means for holding and rotating a blank, a milling cutter, means for effecting a relative longitudinal uniform movement between the blank and the cutter to cut a helical groove, means for relatively moving the cutter and blank toward or from each other during cutting in conformity with variations in the diameter of the blank, and automatic means for angularly moving the cutter during cutting in accordance with variations in the angle of inclination of the groove, the said means being adjustable to change the rate of angular movement.

81. A milling machine comprising in combination, means for holding and rotating a blank in either direction, a milling cutter, means for effecting a relative longitudinal uniform movement between the blank and the cutter to cut a helical groove, means for relatively moving the cutter and blank toward or from each other during cutting in conformity with variations in the diameter of the blank, and automatic means for angularly moving the cutter in either direction during cutting in accordance with variations in the angle of inclination of the groove.

82. A milling machine comprising in combination, means for holding and rotating a blank, a milling cutter, means for effecting a relative longitudinal uniform movement between the blank and the cutter to cut a helical groove, means for relatively moving the cutter and blank toward or from each other during cutting in conformity with variations in the diameter of the blank, and automatic means dependent on the last said movement for angularly moving the cutter during cutting in accordance with variations in the angle of inclination of the groove.

83. A milling machine comprising in combination, means for reciprocating and simultaneously rotating a blank, a milling cutter adapted to engage the blank to cut a helical groove, means for moving the cutter toward or from the blank during cutting in conformity with variations in the diameter of the blank, and means operable in accordance with the aforesaid movement of the cutter toward or from the blank for moving the cutter angularly.

84. A milling machine comprising in combination, means for reciprocating and simultaneously rotating a blank, a milling cutter positioned above the blank and adapted to engage it to cut a helical groove, means for moving the cutter vertically during cutting in conformity with variations in the diameter of the blank, a stationary vertical rack, and gearing movable vertically with the cutter and engaging the rack to move the cutter angularly in accordance with variations in the diameter of the blank.

85. A milling machine comprising in combination, means for holding and rotating a blank, a milling cutter, means for effecting a relative longitudinal uniform movement between the blank and the cutter to cut a helical groove, means for relatively moving the cutter and blank toward or from each other during cutting in conformity with variations in the diameter of the blank, automatic means for supplementally moving the cutter out of cutting relation with the blank after each cutting stroke of the table and for restoring it to cutting relation with the blank before the next cutting stroke of the table, and automatic means for angularly moving the cutter during cutting in accordance with variations in the angle of inclination of the groove.

86. A milling machine comprising in combination, means for holding and rotating a blank, a milling cutter, means for effecting a relative longitudinal uniform movement between the blank and the cutter to cut a helical groove, means for relatively moving the cutter and blank toward or from each other during cutting in conformity with variations in the diameter of the blank, automatic means for supplementally moving the cutter out of cutting relation with the blank after each cutting stroke of the table and for restoring it to cutting relation with the blank before the next cutting stroke of the table, automatic means for angularly moving the cutter during cutting in accordance with variations in the angle of inclination of the groove, and means for preventing the operation of the last said means during the aforesaid supplemental movements of the cutter.

87. A milling machine comprising in combination, means for reciprocating and simultaneously rotating a blank, a milling cutter positioned above the blank and adapted to engage it to cut helical grooves therein, means for moving the cutter vertically during each cutting stroke in conformity with variations in the diameter of the blank, automatic means for supplementally moving the cutter upward after each cutting stroke and downward before the next cutting stroke, automatic means for angularly moving the cutter in accordance with the vertical movements thereof, and means for preventing the operation of the last said means during the aforesaid supplemental movements of the cutter.

88. A milling machine comprising in combination, means for reciprocating and simultaneously rotating a blank, a milling cutter positioned above the blank and adapted to engage it to cut helical grooves therein, means for moving the cutter vertically during each cutting stroke in conformity with variations in the diameter of the blank, automatic means for supplementally moving the cutter upward after each cutting stroke and downward before the next cutting stroke, automatic frictionally acting means for angularly moving the cutter in accordance with the vertical movements thereof, and a stop operable at the end of the cutting stroke to limit the angular movement of the cutter.

89. A milling machine comprising in combination, means for reciprocating and simultaneously rotating a blank, a milling cutter positioned above the blank and adapted to engage it to cut helical grooves therein, means for moving the cutter vertically during each cutting stroke in conformity with variations in the diameter of the blank, automatic means for supplementally moving the cutter upward after each cutting stroke and downward before the next cutting stroke, automatic frictionally acting means for angularly moving the cutter in accordance with the vertical movements thereof, and two stops operable respectively before the beginnings of the supplemental upward and downward movements of the cutter to limit the angular movements of the cutter.

90. The combination of a longitudinally movable work table, a rotatable longitudinal blank carrying spindle on the table, a rotatable cutter fixed against longitudinal movement and adapted to engage the blank, a stationary longitudinal rack adjacent the table, and a train of power connections including reversing gearing interposed between the rack and the spindle whereby the spindle is rotated optionally in either direction when the table is moved.

91. The combination of a longitudinally movable work table, a rotatable longitudinal blank carrying spindle on the table, a rotatable cutter fixed against longitudinal movement and adapted to engage the blank, a stationary longitudinal rack adjacent the table, and a train of power connections interposed between the rack and the spindle including two gears adapted respectively to turn the spindle in opposite directions and a slidable gear adapted to engage either of the first said gears whereby the spindle is rotated optionally in either direction when the table is moved.

92. In combination in a milling machine, a spindle provided with means for holding and turning a blank, a milling cutter adapted to engage the blank, means for effecting relative longitudinal reciprocation between the spindle and the cutter, spindle indexing mechanism for the spindle, means normally connecting the spindle with the aforesaid holding and turning means, and means for releasing the last said means to permit operation of the indexing mechanism.

93. In combination in a milling machine, a spindle connected with means for holding a blank, a milling cutter adapted to engage the blank, means for effecting relative longitudinal reciprocation between the spindle and the cutter, mechanism for turning the spindle alternately in opposite directions in accordance with the aforesaid longitudinal reciprocation, means for disconnecting the spindle from the turning mechanism, and an indexing mechanism connectible with the spindle and operable when the spindle is disconnected from the turning mechanism.

94. In combination in a milling machine, a spindle provided with means for holding a blank, a milling cutter adapted to engage the blank, means for effecting relative longitudinal reciprocation between the spindle and the cutter, mechanism for turning the spindle alternately in opposite directions in accordance with the aforesaid longitudinal reciprocation, an indexing mechanism for the spindle operable intermittently in timed relation to the reciprocation, and automatic means for alternately connecting the spindle to the turning mechanism and to the indexing mechanism whereby the spindle is moved under the control of the said mechanisms alternately.

95. In combination in a milling machine, a spindle provided with means for holding a blank, a milling cutter adapted to engage the blank, means for effecting relative longitudinal reciprocation between the spindle and the cutter, mechanism for turning the spindle alternately in opposite directions in accordance with the aforesaid longitudinal reciprocation, an indexing mechanism for the spindle operable intermittently in timed relation to the reciprocation, and automatic means for alternately connecting the spindle to the turning mechanism and to the indexing mechanism whereby the spindle is moved under the control of the said mechanisms alternately, the said means serving to connect the spindle with each mechanism before it is released from the other whereby accidental movement of the spindle is prevented.

96. In combination in a milling machine, a reciprocating table, a spindle on the table provided with means for holding a blank, a milling cutter adapted to engage the blank, mechanism for turning the spindle alternately in opposite directions in accordance with the forward and backward movements thereof, an indexing mechanism for the spindle, and means operable after each backward movement first to disconnect the spindle from the turning mechanism and connect it to the indexing mechanism which thereupon operates and then to disconnect the spindle from the indexing mechanism and connect it to the turning mechanism.

97. In combination in a milling machine, a reciprocating table, a spindle on the table provided with means for holding a blank, a milling cutter adapted to engage the blank, an indexing mechanism for the spindle bodily movable with the table, an intermittently acting driving means for the indexing mechanism fixed against movement with the table, and operating devices between the movable indexing mechanism and the fixed driving means therefor.

98. In combination in a milling machine, a reciprocating table, a spindle on the table provided with means for holding a blank, a milling cutter adapted to engage the blank, an indexing mechanism for the spindle bodily movable with the table, an intermittently acting driving means for the indexing mechanism fixed against movement with the table, and operating devices including a longitudinal shaft and a gear splined thereon.

99. In combination in a milling machine, a reciprocating table, a spindle on the table provided with means for holding a blank, a milling cutter adapted to engage the blank, mechanism for turning the spindle alternately in opposite directions in accordance with the forward and backward movements thereof, an indexing mechanism for the spindle bodily movable with the table, means movable with the table and operable after each backward movement first to disconnect the spindle from the turning mechanism and connect it to the indexing mechanism which thereupon operates and then to disconnect the spindle from the indexing mechanism and connect it to the turning mechanism, an intermittently acting driving means for the indexing mechanism fixed against movement with the table, and operating devices between the movable indexing mechanism and the fixed driving means therefor.

100. In combination in a milling machine, a reciprocating table, a spindle on the table provided with means for holding a blank, a milling cutter adapted to engage the blank, mechanism for turning the spindle alternately in opposite directions in accordance with the forward and backward movements thereof, an indexing mechanism for the spindle, a double clutch adapted to connect the spindle either to the turning mechanism or the indexing mechanism, and clutch operating means comprising a longitudinal rock shaft and a gear splined on the shaft and movable longitudinally with the table.

101. In combination in a milling machine, a longitudinally movable table, a rotatable cam shaft, a cam on the shaft for reciprocating the table, a spindle on the table provided with means for holding a blank, a milling cutter adapted to engage the blank, mechanism for turning the spindle alternately in opposite directions in accordance with the forward and backward movements thereof, an indexing mechanism for the spindle, a double clutch adapted to connect the spindle either to the turning mechanism or the indexing mechanism, and clutch operating means comprising a longitudinal rock shaft, a gear splined on the shaft and movable longitudinally with the table and a second cam on the said cam shaft for turning the rock shaft in timed relation to the table reciprocation.

102. In combination in a milling machine, a reciprocating table, a spindle on the table provided with means for holding a blank, a milling cutter adapted to engage the blank, mechanism for turning the spindle alternately in opposite directions in accordance with the forward and backward movements thereof, an indexing mechanism for the spindle, operating means for the indexing mechanism comprising a longitudinal shaft and a gear splined on the shaft and movable longitudinally with the table, and means operable after each backward movement first to disconnect the spindle from the turning mechanism and connect it to the indexing mechanism which thereupon cooperates and then to disconnect the spindle from the indexing mechanism and connect it to the turning mechanism.

103. In combination in a milling machine, a reciprocating table, a spindle on the table provided with means for holding a blank, a milling cutter adapted to engage the blank, mechanism for turning the spindle alternately in opposite directions in accordance with the forward and backward movements thereof, an indexing mechanism for the spindle, operating means for the indexing mechanism comprising a longitudinal shaft and a gear splined on the shaft and movable longitudinally with the table, means for turning the shaft through a definite angle after each backward movement of the table, and means operable after each backward movement first to disconnect the spindle from the turning mechanism and connect it to the indexing mechanism which thereupon cooperates and then to disconnect the spindle from the indexing mechanism and connect it to the turning mechanism.

104. In combination in a milling machine, a longitudinally movable table, a rotatable cam shaft, a cam on the shaft for reciprocating the table, a spindle on the table provided with means for holding a blank, a milling cutter adapted to engage the blank, mechanism for turning the spindle alternately in opposite directions in accordance with the forward and backward movements thereof, an indexing mechanism for the spindle, operating means for the indexing mechanism comprising a longitudinal shaft and a gear splined on the shaft and movable longitudinally with the table, means for turning the shaft through a definite angle after each backward movement of the table, a cam on the cam shaft for controlling the turning of the indexing shaft, and means operable after each backward movement first to disconnect the spindle from the turning mechanism and connect it to the indexing mechanism which thereupon cooperates and then to disconnect the spindle from the indexing mechanism and connect it to the turning mechanism.

105. In combination in a milling machine, a longitudinally reciprocating table, a spindle on the table provided with means for holding a blank, a milling cutter adapted to engage the blank, an indexing mechanism for the spindle, operating means for the indexing mechanism comprising a longitudinal shaft and a gear splined on the shaft and movable longitudinally with the table, and means for turning the shaft through a definite angle after each backward movement of the table, the aforesaid operating means being adjustable to cause indexing through different angles.

106. In combination in a milling machine, a longitudinally reciprocating table, a spindle on the table provided with means for holding a blank, a milling cutter adapted to engage the blank, mechanism for turning the spindle alternately in opposite directions in accordance with the forward and backward movements thereof, the said means being adjustable to turn the spindle at any one of a plurality of rates, an indexing mechanism for the spindle, operating means for the indexing mechanism comprising a longitudinal shaft and a gear splined on the shaft and movable longitudinally with the table, and means for turning the shaft through a definite angle after each backward movement of the table.

107. In combination in a milling machine, a longitudinally reciprocating table, a spindle on the table provided with means for holding a blank, a milling cutter adapted to engage the blank, mechanism for turning the spindle alternately in opposite directions in accordance with the forward and backward movements thereof, the said means being adjustable to turn the spindle at any one of a plurality of rates, an indexing mechanism for the spindle, operating means for the indexing mechanism comprising a longitudinal shaft and a gear splined on the shaft and movable longitudinally with the table, and means for turning the shaft through a definite angle after each backward movement of the table, the aforesaid operating means being adjustable to cause indexing through different angles.

108. In combination in a milling machine, a reciprocating table, a spindle on the table provided with means for holding a blank, a milling cutter adapted to engage the blank, an indexing mechanism for the spindle bodily movable with the table, an intermittently acting driving means for the indexing mechanism fixed against movement with the table, and operating devices between the movable indexing mechanism and the fixed driving means therefor, the aforesaid operating devices being adjustable to cause indexing through different angles.

109. In combination in a milling machine, a reciprocating table, a spindle on the table provided with means for holding a blank, a milling cutter adapted to engage the blank, mechanism for turning the spindle alternately in opposite directions in accordance with the forward and backward movements thereof, an indexing mechanism for the spindle, operating means for the indexing mechanism comprising a longitudinal shaft and a gear splined on the shaft and movable longitudinally with the table, means for turning the shaft through a definite angle after each backward movement of the table, means for changing the motion ratio between the shaft and spindle to change the angle of indexing, and means operable after each backward movement first to disconnect the spindle from the turning mechanism and connect it to the indexing mechanism which thereupon cooperates and then to disconnect the spindle from the indexing mechanism and connect it to the turning mechanism.

110. In a milling machine, the combination with a reciprocating table, a spindle on the table for holding a blank, a milling cutter adapted to engage the blank to cut grooves therein and mechanism for indexing the blank after each groove is cut, of a device reciprocating with the table normally in a fixed path and adapted to be moved transversely out of the said path when the spindle has been indexed through a complete revolution, and normally stationary means adapted to be engaged by the said device when it is so moved to stop the operation of the machine.

111. In a milling machine, the combination with a longitudinally movable table, automatic means for moving the table forward and backward, a spindle on the table for holding a blank, a milling cutter adapted to engage the blank during each forward stroke of the table to cut a groove in the blank and means for indexing the blank at the end of each backward stroke of the table, of a device reciprocating with the table in a normally fixed path and adapted to be moved transversely out of the said path when the spindle has been indexed through a complete revolution, and means adapted to be engaged by the said device to stop the operation of the machine at the end of the backward stroke following the transverse movement of the device.

112. In a milling machine, the combination with a longitudinally movable table, automatic means for moving the table forward and backward, a spindle on the table for holding blank, a milling cutter adapted to engage the blank during each forward stroke of the table to cut a groove in the blank and means for indexing the blank at the end of each backward stroke of the table, of a carrier block reciprocating with the table in a normally fixed path and adapted to be moved transversely out of the said path when the spindle has been indexed through a complete revolution, a transversely movabe spring-pressed dog on the block, and means adapted to be engaged by the dog to stop the operation of the machine at the end of the backward stroke following the transverse movement of the device.

113. In a milling machine, the combination with a longitudinally movable table, automatic means for moving the table forward and backward, a spindle on the table for holding a blank, mechanism for turning the spindle alternately in opposite directions in accordance with the aforesaid longitudinal reciprocation, a milling cutter adapted to engage the blank during each forward stroke of the table to cut a spiral groove in the blank and mechanism supplemental to the turning mechanism for indexing the blank at the end of each backward stroke of the table, of a device reciprocating with the table and adapted to be moved transversely when the spindle has been indexed through a complete revolution, and means adapted to be engaged by the said device when it is so moved to stop the operation of the machine.

In testimony whereof, I hereto affix my signature.

FRIEDERICH MÜLLER.